United States Patent
Kanao

(10) Patent No.: US 9,944,050 B2
(45) Date of Patent: Apr. 17, 2018

(54) FLOOR PANEL

(71) Applicant: KANAFLEX CORPORATION, Osaka (JP)

(72) Inventor: Shigeki Kanao, Nishinomiya (JP)

(73) Assignee: KANAFLEX CORPORATION, Osaka (JP)

( * ) Notice: Subject to any disclaimer, the term of this patent is extended or adjusted under 35 U.S.C. 154(b) by 222 days.

(21) Appl. No.: 14/761,687

(22) PCT Filed: Jan. 20, 2014

(86) PCT No.: PCT/JP2014/051009
§ 371 (c)(1),
(2) Date: Jul. 17, 2015

(87) PCT Pub. No.: WO2014/112629
PCT Pub. Date: Jul. 24, 2014

(65) Prior Publication Data
US 2015/0360443 A1    Dec. 17, 2015

(30) Foreign Application Priority Data

Jan. 21, 2013 (JP) .................................. 2013-008494

(51) Int. Cl.
*B32B 13/06*     (2006.01)
*E04F 15/024*    (2006.01)
(Continued)

(52) U.S. Cl.
CPC .............. *B32B 13/06* (2013.01); *B32B 5/20* (2013.01); *B32B 5/22* (2013.01); *B32B 5/32* (2013.01);
(Continued)

(58) Field of Classification Search
CPC ...................................................... B32B 13/06
(Continued)

(56) References Cited

U.S. PATENT DOCUMENTS

2012/0219747 A1*   8/2012  Kanao ...................... E04C 2/06
                                                 428/71

FOREIGN PATENT DOCUMENTS

| JP | 6-62083  | 9/1994  |
| JP | 7-259306 | 10/1995 |

(Continued)

OTHER PUBLICATIONS

International Search Report dated Feb. 18, 2014 in International (PCT) Application No. PCT/JP2014/051009, with English translation.

*Primary Examiner* — Brent T O'Hern
(74) *Attorney, Agent, or Firm* — Wenderoth, Lind & Ponack, L.L.P.

(57) ABSTRACT

In a floor panel (10) including a foamed cement board (1) having at least a foamed cement layer (3), a top plate (5a) attached to an upper surface of the foamed cement board (1), and a bottom plate (5b) attached to a lower surface of the foamed cement board (1). The foamed cement layer (3) is configured so that the layer (3) has a porous hardened cement phase and a fiber dispersed in the phase. Also, the layer (3) has a thickness within a range from 12 to 30 mm and a specific gravity within a range from 0.8 to 1.5. Thereby, the floor panel can be light in weight while desired strengths for the floor panel are established. The floor panel can be readily produced without any complicated processes.

9 Claims, 17 Drawing Sheets

(51) Int. Cl.

| | | |
|---|---|---|
| E04F 15/08 | (2006.01) |
| B32B 7/12 | (2006.01) |
| B32B 9/00 | (2006.01) |
| E04F 15/10 | (2006.01) |
| B32B 5/20 | (2006.01) |
| B32B 5/22 | (2006.01) |
| B32B 5/32 | (2006.01) |
| B32B 7/04 | (2006.01) |
| B32B 9/04 | (2006.01) |
| B32B 13/02 | (2006.01) |
| B32B 13/12 | (2006.01) |
| B32B 15/04 | (2006.01) |
| B32B 15/08 | (2006.01) |
| B32B 15/18 | (2006.01) |
| B32B 15/20 | (2006.01) |
| B32B 27/06 | (2006.01) |
| B32B 27/18 | (2006.01) |
| B32B 27/30 | (2006.01) |
| B32B 27/32 | (2006.01) |
| B32B 27/38 | (2006.01) |
| B32B 27/40 | (2006.01) |
| B32B 27/42 | (2006.01) |
| B32B 3/04 | (2006.01) |

(52) U.S. Cl.
CPC .............. *B32B 7/045* (2013.01); *B32B 7/12* (2013.01); *B32B 9/002* (2013.01); *B32B 9/04* (2013.01); *B32B 9/045* (2013.01); *B32B 9/046* (2013.01); *B32B 13/02* (2013.01); *B32B 13/12* (2013.01); *B32B 15/046* (2013.01); *B32B 15/08* (2013.01); *B32B 15/18* (2013.01); *B32B 15/20* (2013.01); *B32B 27/065* (2013.01); *B32B 27/18* (2013.01); *B32B 27/302* (2013.01); *B32B 27/304* (2013.01); *B32B 27/308* (2013.01); *B32B 27/32* (2013.01); *B32B 27/38* (2013.01); *B32B 27/40* (2013.01); *B32B 27/42* (2013.01); *E04F 15/0247* (2013.01); *E04F 15/02405* (2013.01); *E04F 15/02452* (2013.01); *E04F 15/085* (2013.01); *E04F 15/107* (2013.01); *B32B 3/04* (2013.01); *B32B 2255/06* (2013.01); *B32B 2255/205* (2013.01); *B32B 2255/26* (2013.01); *B32B 2262/0223* (2013.01); *B32B 2262/0253* (2013.01); *B32B 2262/0269* (2013.01); *B32B 2262/101* (2013.01); *B32B 2262/103* (2013.01); *B32B 2262/106* (2013.01); *B32B 2266/02* (2013.01); *B32B 2266/025* (2013.01); *B32B 2266/0228* (2013.01); *B32B 2266/0235* (2013.01); *B32B 2266/0242* (2013.01); *B32B 2266/0278* (2013.01); *B32B 2266/0285* (2013.01); *B32B 2266/04* (2013.01); *B32B 2266/049* (2016.11); *B32B 2266/06* (2013.01); *B32B 2307/50* (2013.01); *B32B 2307/718* (2013.01); *B32B 2419/04* (2013.01); *B32B 2471/00* (2013.01); *Y10T 428/24198* (2015.01); *Y10T 428/24967* (2015.01); *Y10T 428/249968* (2015.04)

(58) Field of Classification Search
USPC .......................................................... 428/68
See application file for complete search history.

(56) References Cited

FOREIGN PATENT DOCUMENTS

| JP | 8-100510 | 4/1996 |
|---|---|---|
| JP | 2000-1974 | 1/2000 |
| JP | 2000-104392 | 4/2000 |
| JP | 2000-336912 | 12/2000 |
| JP | 2008-82100 | 4/2008 |
| JP | 4454693 | 2/2010 |
| JP | 2010-255279 | 11/2010 |
| JP | 2010-281037 | 12/2010 |
| JP | 2011-38378 | 2/2011 |
| WO | 96/04441 | 2/1996 |

* cited by examiner (a)

(b)

(a)

(b)

(a)

(b)

FLOOR PANEL

TECHNICAL FIELD

The present invention relates to a floor panel which is preferable as a flooring material to be used indoor or outdoor, particularly as a flooring material for free access flooring (so-called as an OA or raised flooring).

BACKGROUND ART

Conventional floor panel made of concrete is produced by pouring concrete into a rectangular formwork to be in a form of plate having a small thickness. During the pouring of the concrete into the formwork, some reinforcing materials such as expand metal and reinforcing bar have been previously placed in the formwork to be integrated within the resulting hardened concrete in order to increase rigidity of the resulting panel.

The expand metal is placed in approximately whole of the plane of the floor panel. The reinforcing bars are placed, for example, along outer periphery of the floor panel, or on the center of the floor panel wherein the reinforcing bars are crossing to each other (see, for example, Patent Literature 1).

Moreover, as other embodiment of floor panel, a floor panel made of steel, which contains lightweight concrete therein, is known, which comprises a top plate made of steel and a bottom plate made of steel, which are placed facing to each other, to form a hollow structure, and joined together at their peripheries, wherein lightweight concrete is poured and then hardened in the hollow structure (see, for example, Patent Literature 2).

Each of the floor panels described above is used as an indoor flooring material. Therefore, a smaller thickness is required. Herein, concrete itself has insufficient rigidity, therefore, it causes problems. For example, reinforcing material made of metal is embedded in the concrete, in order to reinforce the concrete, and the steel plates cover whole of the lightweight concrete.

PRIOR ART DOCUMENTS

Patent Literatures

Patent Literature 1: JP 2008-82100 A
Patent Literature 2: JP H07-259306 A
Patent Literature 3: JP 2011-38378 A

SUMMARY OF INVENTION

Problems to be Solved by the Invention

However, in the former floor panel described above, many metal reinforcing materials such as expand metal and reinforcing bar should be embedded in the concrete. Therefore, it is difficult to realize the light-weighted floor panel. Moreover, the metal reinforcing material should be set up at a predetermined location in the formwork. Thereby, the production process becomes complicated.

In the latter floor panel, steel plates should be assembled into a liquid-tight hollow structure, since leakage of the concrete during the pouring of the lightweight concrete paste must be prevented. Thereby, the production cost is increased and the production process becomes complicated, which cause problems.

The present invention is contemplated in order to solve the problems in the above-described floor panel made of concrete. Therefore, the purposes of the present invention consist in a provision of a floor panel, which is able to be light-weighted, while desired strengths for the floor panel is established, and which can be readily produced without any complicated processes.

Moreover, the purposes of the present invention consist in protection of the peripheral surface of the floor panel, for example, on the side surfaces and corners of the floor panel, and therefore, in prevention of the floor panel from being damaged during the transport, storage, application or use of the panel.

In addition, the purposes of the present invention consist in a provision of a floor panel having an excellent design.

Means for Solving Problems

According to the present invention, the following floor panel can be provided.

A floor panel comprising
   a foamed cement board comprising at least a foamed cement layer,
   a top plate attached to an upper surface of the foamed cement board, and
   a bottom plate attached to a lower surface of the foamed cement board, which is characterized in that the foamed cement layer comprises a porous hardened cement phase and a fiber dispersed in the phase, and the foamed cement layer has a thickness within a range from 12 to 30 mm and a specific gravity within a range from 0.8 to 1.5.

A marginal part of at least one of the top and bottom plates can cover at least a part of a peripheral surface of the foamed cement board.

According to one aspect of the present invention, both of the marginal part of the top plate and the marginal part of the bottom plate can cover the peripheral surface of the foamed cement board wherein the marginal parts are opposite to each other.

A distance between the marginal part of the top plate and the marginal part of the bottom plate, which are opposite to each other, may be within a range from 1 to 15 mm.

According to one aspect of the present invention, the top plate may have an area equal to or larger than that of the upper surface of the foamed cement board,
   the marginal part of the bottom plate may cover at least a part of the peripheral surface of the foamed cement board, and
   the floor panel may further comprise a stone board or a panel having a stone board, which has an area larger than that of the top plate, on the upper surface of the top plate.

At least one of the top and bottom plates may be a metal plate having a thickness within a range from 0.25 to 1.0 mm.

According to one aspect of the present invention, at least one of the top and bottom plates may be attached to the upper surface of the foamed cement board or the lower surface of the foamed cement board by an adhesive.

The adhesive may comprise least one resin selected from the group consisting of chlorinated polyolefin based-, polyurethane based-, epoxy based-, acrylate based-, vinyl based-, vinyl acetate based-, polyester based-, ethylene-vinyl acetate copolymer based-, acrylate-vinyl acetate copolymer based-, polyamide based-, and ionomer based resins.

Herein, the adhesive may be used in an amount, for example, within a range from 150 to 500 $g/m^2$, and preferably within a range from 200 to 500 $g/m^2$.

According to one aspect of the present invention, the foamed cement board may further comprise a fiber reinforced resin layer formed on at least one surface of the foamed cement layer.

Effects of the Invention

According to the floor panel of the present invention, the floor panel can be light-weighted while desired strengths for the floor panel are established. Such floor panel can be readily produced without any complicated processes.

Moreover, according to the present invention, the peripheral surface of the floor panel can be protected, for example, on the side surfaces and corners of the floor panel. Thereby, the floor panel can be prevented from being damaged during the transport, storage, application or use of the panel.

In addition, according to the present invention, a floor panel having an excellent design can be provided.

BRIEF DESCRIPTION OF DRAWINGS

FIG. 1 is a schematic view illustrating a floor panel as Embodiment 1 according to the present invention, wherein FIG. 1(a) is a perspective view, and FIG. 1(b) is a cross-sectional view.

FIG. 4 is a schematic top view illustrating a floor panel as Modification 2 of the embodiment shown in FIG. 1 or FIG. 2, wherein FIG. 4(a) illustrates the panel with a lid being detached therefrom, and FIG. 4(b) illustrates the panel with a lid being attached thereto.

FIG. 5 is a schematic view illustrating a floor panel as Embodiment 3 according to the present invention, wherein FIG. 5(a) is a perspective view, and FIG. 5(b) is a cross-sectional view.

DESCRIPTION OF EMBODIMENTS

Hereinafter, the floor panel according to the present invention is further described, as some embodiments, with referring to the appended drawings.

Embodiment 1

Figure 1:
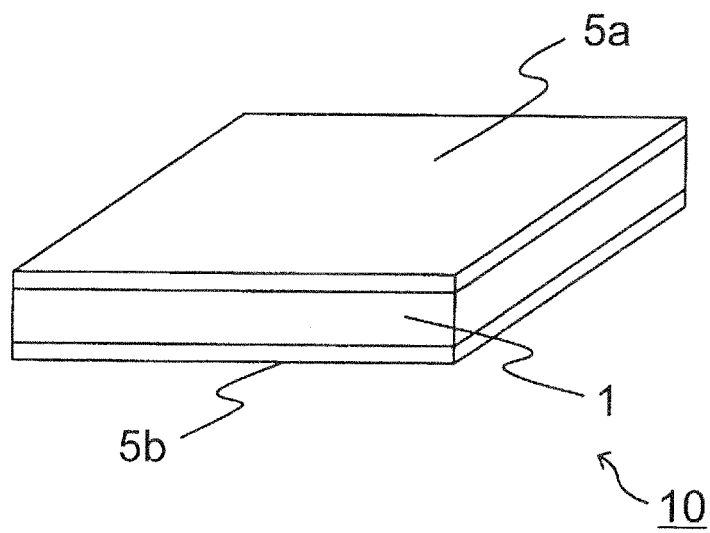
Figure 1:
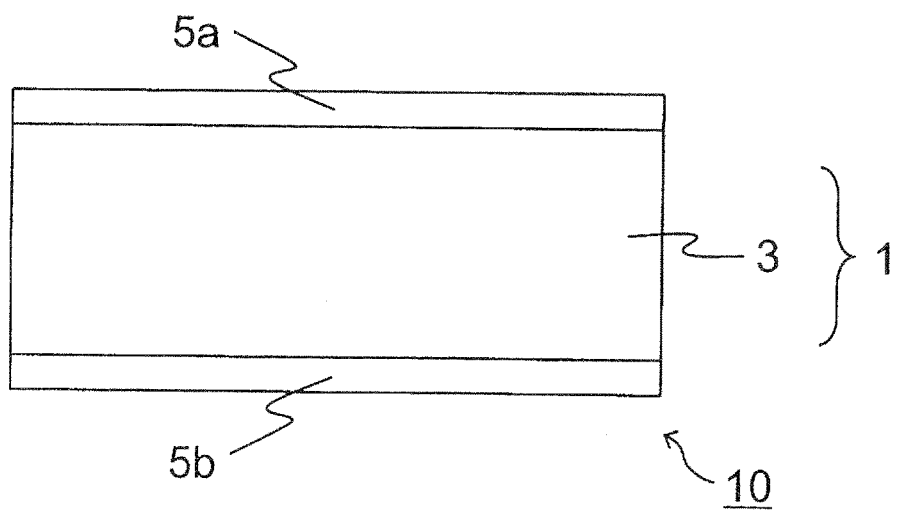

As shown in FIG. 1, a floor panel 10 as one embodiment according to the present invention comprises a foamed cement board 1; a top plate 5a attached to an upper surface the foamed cement board 1; and a bottom plate 5b attached to a lower surface of the foamed cement board 1. The floor panel 10 can be used such that the top plate 5a is located as a front surface (or a flooring surface) of the floor panel, and that the bottom plate 5b is located as a back surface of the floor panel.

In this embodiment, the foamed cement board 1 is comprised of a foamed cement layer 3. Herein, the top plate 5a and the bottom plate 5b are attached to an upper surface and a lower surface of the foamed cement layer 3, respectively. However, as long as the foamed cement board 1 comprises at least one foamed cement layer, the foamed cement board 1 may comprise other constituting part(s) (see, for example, Embodiment 2).

The foamed cement layer 3 is comprised of a material comprising at least a hardened cement(s) and a fiber(s) as well as a lot of bubbles (or pores) therein. More specifically, the foamed cement layer 3 comprises a hardened cement phase, wherein a lot of bubbles are distributed to form porous structure, and a fiber dispersed therein. The bubbles in the foamed cement layer contribute to light-weighting of the foamed cement layer 3 or the resulting floor panel 10 therefrom. The bubbles can increase adiabaticity thereof. The fiber contained in the foamed cement layer 3 acts as a reinforcing fiber (hereinafter, which may be referred to as "reinforcing fiber". The fiber contributes to light-weighting of the foamed cement layer 3 or the resulting floor panel 10 therefrom. In addition, the fiber can increase the strength of the foamed cement layer 3 or the resulting floor panel 10 therefrom.

The foamed cement layer 3 can be produced so that the foamed cement layer 3 has a thickness within a range from 12 to 30 mm, a specific gravity within a range from 0.8 to 1.5, and an amount of the fiber, for example, within a range from 1 to 15 kg/m$^3$, and preferably within a range from 1 to 10 kg/m$^3$. As a result of intensive research by the inventor, it is found that the foamed cement board 1 comprising the foamed cement layer 3 under the conditions described above can be used to be placed between the top plate 5a and the bottom plate 5b to provide a light-weighted floor panel 10 having a sufficient strength with the optimized balance between the strength and the weight thereof.

Thickness of the foamed cement layer 3 is set within a range from 12 to 30 mm. In the case of the foamed cement layer 3 has a thickness less than 12 mm, the foamed cement layer 3 or the resulting floor panel 10, as a whole, may have an insufficient strength. In the case of the thickness is more than 30 mm, the foamed cement layer 3 or the resulting floor panel 10 may gain in weight, and therefore the handling-property (or workability) thereof may be deteriorated. The foamed cement layer 3 has a thickness preferably within a range from 15 to 25 mm, typically within a range from about 19 to 23 mm.

The specific gravity of the foamed cement layer 3 is set within a range from 0.8 to 1.5. In the case that the foamed cement layer 3 has a specific gravity less than 0.8, the foamed cement layer 3 or the resulting floor panel 10, as a whole, may have an insufficient strength. In the case that the specific gravity is more than 1.5, the foamed cement layer 3 or the resulting floor panel 10 may be gained in weight, and therefore, the handling-property (or workability) thereof may be deteriorated. The specific gravity of the foamed cement layer 3 is preferably within a range from 1.1 to 1.3.

Herein, the term of "specific gravity" used in the present invention means a specific gravity relative to water (–).

The specific gravity of the foamed cement layer 3 may be influenced by various factors. Particularly, adjusting each of the amounts of the bubbles and the fiber contained in the foamed cement layer can control the specific gravity. The bubbles may be either cellular (or independent) bubbles or open-cell (or continuous) bubbles. The foamed cement layer 3 has a greater amount of the bubbles per one unit volume (or a greater total volume of the bubbles), and the foamed cement layer 3 has a smaller specific gravity. Generally, but depending on the fiber to be used, the foamed cement layer 3 contains a greater amount of the fiber per one unit volume, the foamed cement layer 3 has a smaller specific gravity.

The amount of the fiber contained in the foamed cement layer 3 is set, for example, within a range from 1 to 15 kg/m$^3$, and preferably within a range from 1 to 10 kg/m$^3$. Setting the amount of the fiber contained in the foamed cement layer 3 within the range, one fiber can be twined round other fiber in the foamed cement layer 3 (to form a reinforced structure) and act as a reinforcing fiber to increase the strengths of the foamed cement layer 3. In the case that the amount of the fiber contained in the foamed cement layer 3 is less than 1 kg/m$^3$, the foamed cement layer 3 or the resulting floor panel 10 may gain in weight and the strength may be decreased. In the case that the amount of the fiber is more than 15 kg/m$^3$, it may be difficult to form the hardened cement phase as a continuous phase, and the foamed cement layer 3 may become brittle. The amount of the fiber contained in the foamed cement layer 3 is more preferably within a range from 3 to 10 kg/m$^3$, and yet more preferably within a range from 3 to 8 kg/m$^3$.

The hardened cement phase means a hardened cement paste, i.e., a phase (or a disperse medium phase) comprising, as a main component, a hardened article resulted from a reaction of a cement with water. Herein, the hardened cement phase may contain a substance(s) and/or an ingredient(s) having any dispersibility, compatibility or solubility, in a relatively small amount, to the hardened cement phase.

The cement to be used as a raw material includes, but is not particularly limited to, any kind of cement such as ordinary portland cement, high-early-strength portland cement, ultra high-early-strength portland cement, etc. Among others, high-early-strength portland cement is preferable due to its aspects such as the resulting productivity, strength, etc.

The mixing rate of water to the cement is described as follows. For example, from 20 to 100 parts by weight of water, preferably from 20 to 50 parts by weight of water is mixed with 100 parts by weight of cement. In the case that the content proportion of the water is excessively large, the strength of the foamed cement layer 3 may have a tendency to be decreased. In the case that the content proportion of water is excessively small, the mixture containing raw materials in the unhardened conditions may have a tendency with the flowability being decreased.

As described above, the reinforcing fibers may be dispersed and presented in the hardened cement phase. The reinforcing fibers may be twined to each other to form a reinforced structure.

The reinforcing fiber includes polyvinyl alcohol-based fibers; polyolefin-based fibers such as polypropylene-based fibers and polyethylene-based fibers; aramid fibers; carbon fibers; copper fibers; glass fibers; etc. Among others, polyvinyl alcohol-based resins are preferable since the polyvinyl alcohol-based resins have a higher durability and an excellent compatibility with the cement and the hardened cement paste.

A length of the reinforcing fiber is preferably within a range from 4 to 35 mm, but is not particularly limited thereto. In the case that the reinforcing fiber has a length less than 4 mm, the tendency with the reinforcing effects being insufficient can be seen. In the case that the reinforcing fiber has a longer length, it can provide a more advantage in the reinforcing effects. However, in the case that the fiber has a too large length, the dispersibility of the fiber may be decreased, and the reinforcing fiber may be locally distributed in the resulting foamed cement layer 3. Therefore, the strengths of the foamed cement layer 3 sometimes may be decreased.

Thickness of the reinforcing fiber may be, for example, within a range from 10 to 100 μm, but is not particularly limited thereto.

With respect to the foamed cement layer 3, the hardened cement phase may comprise other material(s) to be dispersed such as an aggregate (including finely-divided aggregate, divided aggregate, roughly-divided aggregate) and the like, in addition to the reinforcing fiber, in a dispersed state. In the case that it contains the aggregate, a smaller amount of the aggregate to be added is preferable in order to provide a higher strength, and a smaller size of the aggregate is preferable. The finely-divided aggregate is preferable.

The foamed cement layer 3 may contain additional other substance(s) and/or component(s) such as a gas forming agent, a foaming agent, a water-reducing agent, a flame retardant, a coloring gent, an air entraining (AE) agent, a waterproof agent, and the like, in any form, e.g., in a form compatibilized with or solubilized in the hardened cement phase, or dispersed in the hardened cement phase.

It is preferable to use the gas forming agent and/or the foaming agent in order to introduce air babbles into the resulting foamed cement layer 3. The gas forming agent and/or the foaming agent may include, but is/are not particularly limited to, any gas forming agent and/or foaming agent available in the applications of cement, mortar, concrete, etc. The gas forming agent may include protein-based gas forming agents; surfactant-based gas forming agents such as polyethers, aromatic sulfonates (e.g., alkylbenzene sulfonates, and the like), sulfur-containing compounds (e.g., higher alkylether sulfates, and the like); resin-based gas forming agents, and the like. The foaming agent may include metal-based foaming agents such as aluminum powder, etc.

The amount(s) of the gas forming agent and/or the foaming agent to be added and the method(s) for adding the gas forming agent and/or the foaming agent can be selected/adjusted, but are not particularly limited, such that the specific gravity of the foamed cement layer 3 is within a range from 0.8 to 1.5. The amount of the gas forming agent to be added and/or the amount of the foaming agent to be added is/are, generally, within a range from 0.1 to 3 parts by weight relative to 100 parts by weight of the cement. Methods for addition thereof include pre-foaming, mix-forming, after-foaming, etc. Typically, pre-foaming may be applied thereto.

Specifically, the foamed cement layer 3 can be produced, for example, as follows.

A cement and water, and a water-reducing agent, if necessary, and the like, are mixed. Thereto, a reinforcing fiber is added and kneaded to give a mixture containing these raw materials under unhardened conditions. In the meantime, air (or compressed air) from a compressor is introduced into a gas forming agent to form bubbles wherein it is foamed in a predetermined magnification, for example, within a range from about 10 to 30 times. The bubbled material is added into the above-described raw material mixture, and then the mixture is stirred until the mixture is homogenous as a whole. The foamed raw material mixture can be obtained under unhardened conditions (or under fresh conditions). Herein, the bubbled material may be additionally added to the raw material mixture to reach to the desired value of the specific gravity while the specific gravity of the raw material mixture is appropriately measured during the stirring of the mixture.

The resulting foamed raw material mixture described above is poured into a formwork for molding, and then, the mixture is cured and hardened. Thus, the foamed cement layer 3 can be produced wherein the reinforcing fibers are dispersed in the porous hardened cement phase under the conditions where the fibers are twined to each other.

Herein, in the production of the foamed cement layer 3, the formwork having a suitable size corresponding to that of the foamed cement layer 3 can be employed to directly mold the foamed cement layer 3 therein, and then, it may be cured and hardened. Alternatively, once a formwork having a larger size can be employed to mold a foamed cement block having a larger size therein, and then, it may be cured and hardened. Subsequently, the block may be sliced into a plate having a desired thickness and dimensions to produce the foamed cement layer 3. In the latter case, a single formwork can produce a plurality of the final foamed cement layers 3. Since the curing and hardening can be conducted at once, some advantages such as increase in the productivity are obtained.

The curing may include general curings, steam curings, and any combination thereof. The curing may not be conducted until the curing is completed in the formwork. In that case, steam curing is conducted in the formwork until the mixture is hardened (or solidified) to some extent. Then, generally, after few hours, it is taken out from the formwork, and additional curing can be conducted. Thereby, the molding cycle using the formwork is shortened and the productivity is increased.

According to the method for producing such foamed cement layer 3, if only the foamed raw material mixture under unhardened conditions is stirred so as to uniformly disperse the reinforcing fibers therein during its kneading the mixture, the reinforced structure can be obtained, wherein the reinforcing fibers are twined to each other, and the strength without unevenness is obtained. Therefore, during the production of the foamed cement layer 3, the conventional complicated procedures are unnecessary such as setting of the reinforcing material made of a metal such as expand metal at the predetermined positions in the formwork. Thereby, the floor panel can be conveniently produced, and the production cost can be decreased. In the production method of the above-described foamed cement layer 3 exemplified above, the method using pre-foaming procedure is described. However, even in the case that other foaming procedure such as mix-foaming and after-foaming is employed to produce the foamed raw material mixture under unhardened conditions, the reinforcing fibers can be uniformly dispersed therein and give the similar results to those described above.

In this embodiment, as an upper surface (material or part) and a lower surface (material or part) of the foamed cement board 1, a top plate 5a can be attached to one side of thus produced foamed cement layer 3 and a bottom plate 5b can be attached to the other side of the foamed cement layer 3.

The raw material, thickness, configuration, or the like, of the top plate 5a and the bottom plate 5b may be appropriately selected depending on the application of the floor panel, etc.

The bottom plate 5b can be used such that the bottom plate 5b is located at backside of the floor panel 10. Therefore, the design property is not generally required for the bottom plate 5b. The bottom plate 5b may include, for example, metal plates (comprising surface-treated metal plates), in order to increase the strength of the floor panel 10, etc. Specifically, metal plates such as iron plate, aluminium plate and steel plate can be employed. The examples of the steel plate comprise so-called stainless steel plates, etc. The metal plate may be subjected to a surface treatment such as a molten (or immersion) plating, an electroplating, a resin coating, etc. Among others, a steel plate subjected to a hot dip galvanizing or an electro-galvanizing, or a galvanized steel plate, and a ZAM steel plate are preferable since they have a higher corrosion resistance, respectively.

The metal plate includes a punching metal having arranged openings, a lath, etc.

The bottom plate 5b is a plate having a small thickness less than 3 mm, which is sufficient, preferably having a thickness within a range from 0.25 to 1.0 mm, in the case that the bottom plate 5b is a metal plate. Thereby, a sufficient and proper strength can be provided.

The top plate 5a may be used a plate same or similar to the bottom plate 5b described above. In order to obtain such sufficient and proper strength for the floor panel 10, it is preferable that at least one of the top plate 5a and the bottom plate 5b is a metal plate having a thickness within a range from 0.25 to 1.0 mm. It is more preferable that the top plate 5b has a thickness within a range from 0.25 to 0.65 mm.

However, the top plate 5a may be used to be placed as a front surface (material or part) of the floor panel 10. Therefore, the design property is sometimes required on the top plate 5a. In such case, as the top plate 5a, for example, a plate such as a stone board and a panel having a stone board may be used. Alternatively, on the upper surface of the top plate 5a, a stone board or a panel having a stone board may be placed. The stone board includes, but is not particularly limited to, any kind of stone board, such as a board made of a natural stone (e.g., Mikage containing granite, diorite, gabbro, or marble, or the like) in a form of plate. It may be a board made of an artificial stone in a form of plate. The panel having a stone board may be a panel wherein the above-described stone board is attached to a panel component (or material) comprised of the foamed cement, which is further light-weighted and more inexpensive than the stone board having a thickness same to that of this panel structure, and which has excellent properties such as a water proof property. Examples of the panel having a stone board include a panel having a decorative stone board described in JP 4454693 B of KANAFLEX CORPORATION, more specifically a panel having a decorative stone board commercially available under a name of KanaStone (registered trademark), etc. Thickness of the stone board or the panel having a stone board is not particularly limited. The stone board may have a thickness, for example, within a range from 3 to 15 mm, preferably within a range from 3 to 12 mm, which allows the board to be processed to an extent with the stone board being prevented from being cracked or broken. The panel having a stone board may have a thickness, for example, within a range from 5 to 35 mm, preferably within a range from 10 to 35 mm, more preferably within a range from 10 to 20 mm, yet more preferably within a range from 15 to 18 mm.

Herein, the above-described panel having a stone board may include, for example, a panel having a stone board commercially available from KANAFLEX CORPORATION, which is a so-called high strength-KanaStone, wherein a porous foamed cement layer (having a thickness within a range from 5 to 20 mm), as a panel component, which is same or similar to the above-described foamed cement layer, is attached to a stone board (having a thickness within a range from 3 mm to 15 mm). The porous foamed cement layer contains a plurality of fiber reinforced resin layers (each of which has a thickness within a range from 0.1 to 2.0 mm), preferably three (3) layers, each of which is further described below (e.g., FRP layer wherein glass fiber is embedded in an urethane resin, etc.). By using of such panel having a stone board, a floor panel having an excellent load resistant strength and an excellent design property can be provided.

Each of these top plate 5a and bottom plate 5b may be attached to the upper surface or the lower surface of the foamed cement board 1 (or the foamed cement layer 3 in this embodiment) by an adhesive.

The adhesive may include, for example, an adhesive comprising at least one resin selected from the group consisting of chlorinated polyolefin based-, polyurethane based-, epoxy based-, acrylate based-, vinyl based-, vinyl acetate based-, polyester based-, ethylene-vinyl acetate copolymer based-, acrylate-vinyl acetate copolymer based-, polyamide based- and ionomer based-resins. Among others, an adhesive comprising an epoxy based-resin or a polyurethane based-resin is preferable since such adhesive provides a higher adhesive property and strength.

An amount of the adhesive to be used is, for example, within a range from 150 to 500 g/m$^2$, preferably within a range from 200 to 500 g/m$^2$, more preferably within a range from 200 to 350 g/m$^2$ depending on the adhesive to be used as well as the material of the surface of the foamed cement board 1 to be adhered. Thereby, a sufficient and proper adhesive strength can be provided.

Herein, the amount of the adhesive to be used means the amount of the adhesive in a state before its adhesion (i.e., before its hardening). It may be considered that this amount approximately equals to that of the adhesive remaining after the adhesion.

In this embodiment, both of the top plate 5a and the bottom plate 5b may be attached to the foamed cement board 1 by the adhesive(s). However, the present invention is not limited to this embodiment. Any one of the top plate 5a and the bottom plate 5b (e.g., the top plate 5a) or both thereof may be attached to the foamed cement board 1 according to the other procedure. Other procedure includes, but is not particularly limited to, for example, a press, a thermocompression, and the like, although it depends on the combination of the surface material of the foamed cement board 1 and the surface material of the top plate 5a and/or the surface material of the bottom plate 5b, which are attached to each other.

If only both of the top plate 5a and the bottom plate 5b can mostly cover the upper surface and the lower surface of the foamed cement board 1, respectively, all the surfaces may not be covered by these plates. Alternatively, each of the top plate 5a and the bottom plate 5b may have a larger area than that of each of the upper surface and the lower surface of the foamed cement board 1.

It is the most convenient that a planar configuration of floor panel 10 according to this embodiment is a square shape as illustrated in FIG. 1 (a) to provide a single unit. However, it is not limited thereto. The floor panel 10 may have any appropriate planar configuration.

As described above, the floor panel 10 according to this embodiment is described in detail. The floor panel 10 is light-weighted and has a strength necessary for the floor panel. Herein, the floor panel 10 is mainly comprised of an inorganic material(s). Therefore, it is flame-retardant, and the flame-retardant treatment is unnecessary. Moreover, the floor panel 10 comprises a foamed cement layer 3 therein. Therefore, this panel has an electric shock prevention property.

Herein, the strength required for the floor panel may be varied depending on its application. For example, the strength required for the free-access flooring may be evaluated according to a static load test, an impact test, and a rolling load test, which are defined in JIS A 1450, "testing methods for free-access flooring". Each of these testing methods is as defined therein, but briefs are as follows.

Static load test: a deformation value is measured when the given loading weight (e.g., 3,000 N) is applied to the loading point (or the most week point) of the panel. Subsequently, the deformation value still remaining after removing the loading weight is measured.

Impact test: a deformation value still remaining after free-falling of an impact-applying article (or a 30 kg of sand bag) from a height of 250 mm to a point to be impacted (or the most week point) of the panel is measured.

Rolling load test: a deformation value still remaining after 5,000 reciprocating motions of a wheel in a line direction (via the most week point) of the panel, under conditions where a given loading weight (e.g., 1,000 N) is applied to the wheel, is measured.

The floor panel 10 of this embodiment has the following performances, as results of the above-described tests, which are verified by the inventor of this invention.

Static load test: no more than 5.0 mm of the deformation value and no more than 3.0 mm of the remaining deformation value Impact test: no more than 3.0 mm of the remaining deformation value Rolling load test: no more than 3.0 mm of the remaining deformation value Embodiment 2

Figure 2:
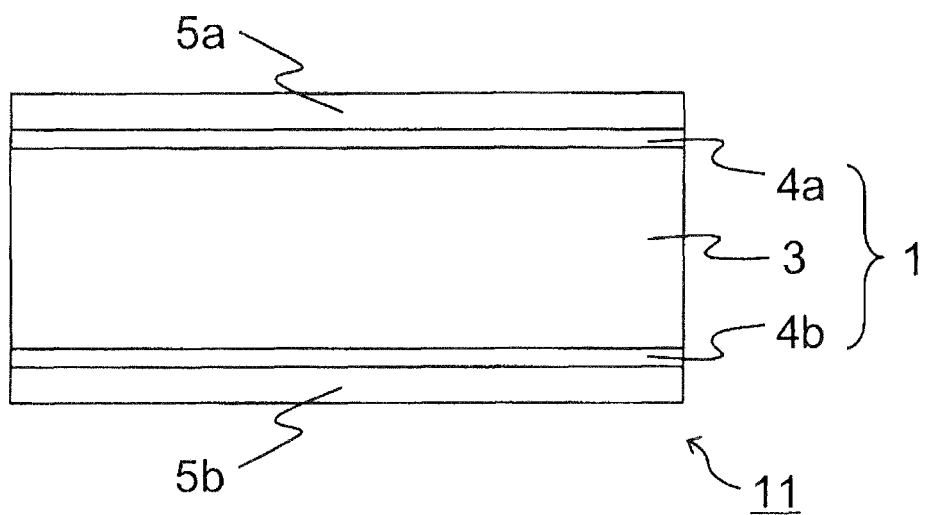
FIG. 2 is a schematic cross-sectional view illustrating a floor panel as Embodiment 2 according to the present invention.

As shown in FIG. 2, the floor panel 11 according to this embodiment, which is same or similar to the floor panel 10 as Embodiment 1, comprises a foamed cement board 1; a top plate 5a attached to an upper surface of the foamed cement board 1; and a bottom plate 5b attached to a lower surface of the foamed cement board 1. The floor panel 11 may be used so that the top plate 5a is located as a front surface (or a flooring surface) of the floor panel and so that the bottom plate 5b is located as a back surface of the floor panel.

However, in this embodiment, the foamed cement board further comprises a fiber reinforced resin layers 4a formed on one side of the foamed cement layer 3 and a fiber reinforced resin layer 4b formed on the other side of the foamed cement layer 3, and the top plate 5a is attached to the fiber reinforced resin layer 4a and the bottom plate 5b is attached to the fiber reinforced resin layer 4b. These features are different from those of the floor panel 10 as Embodiment 1.

Hereinafter, the floor panel 11 of this embodiment is described mainly on the features different from those of the floor panel 10 as Embodiment 1. As long as it is not particularly described, the descriptions for Embodiment 1 are similarly applied to this embodiment.

In this embodiment, the fiber reinforced resin layers 4a and 4b covering both sides of the foamed cement layer 3 are layers, each of which has a reinforcing fiber embedded in a resin (FRP layer).

Each of the fiber reinforced resin layers 4a and 4b may have a thickness, for example, within a range from about 0.1 mm to about 3.0 mm, preferably within a range from about 0.2 mm to about 3.0 mm.

The reinforcing fiber contained in the fiber reinforced resin layer 4a or 4b may include the material same or similar to that of the reinforcing fiber in the foamed cement layer 3 in Embodiment 1 as described above. Herein, with respect to the length of the reinforcing fiber, it is preferable that the fiber having a length within a range from 10 mm to 50 mm is employed since the fiber reinforced resin layers 4a and 4b can be formed by a splay method described below.

A preferable resin (or synthetic resin) to constitute a fiber reinforced resin layer 4a or 4b includes, for example, a polystyrene foam, a polyethylene foam, a rigid polyurethane foam, a rigid polyvinyl chloride foam, an urea foam, a phenol foam, an acrylate foam, a cellulose acetate foam, and other foamable synthetic resins. An expansion ratio (or magnification) of the foamable synthetic resin to form the fiber reinforced resin layer 4a or 4b is preferably within a range from about 2 to about 10 expansion times, but is not particularly limited thereto. A resin such as a polystyrene resin, a polyethylene resin, a rigid polyurethane resin, a rigid polyvinyl chloride resin, an urea resin, a phenol resin, a phenol-urethane resin, an acrylate resin, a cellulose acetate resin, an epoxy resin, and other non-foamable synthetic resins, can be employed, but it is not limited thereto.

Specifically, the fiber reinforced resin layers 4a and 4b can be formed, for example, by integrating with the foamed cement layer 3 as described below.

Initially, a glass roving wound on a roll is unwound and then cut into a short fiber having a length, for example, about 20 mm, to provide a reinforcing fiber. Then, on one surface of the foamed cement layer 3 prepared according to the same or similar procedures to those described in Embodiment 1, the reinforcing fibers are applied by using of an air gun thereon, and a liquid resin (preferably an foamable synthetic resin) is sprayed thereon from a nozzle. Thereby, the reinforcing fiber is immersed in the liquid resin to provide a fiber reinforced resin layer after hardening the resin. Such procedures are similarly conducted on the other surface of the foamed cement layer 3 to produce the fiber reinforced resin layers 4a and 4b.

In order to smooth the surfaces of the fiber reinforced resin layers 4a and 4b and to provide uniform thicknesses thereof, both surfaces of the foamed cement layer 3 having these fiber reinforced resin layers 4a and 4b, i.e., both surfaces of the foamed cement board 1 may be pressed by pushing plates. The pressing is preferably conducted at a pressure, for example, within a range from 100 to 150 kgf/mm$^2$ for 20 to 40 minutes. In the case that the time period for pressing is less than 20 minutes, the thicknesses of the fiber reinforced resin layers 4a and 4b may be ununiform, or the foamed cement layer 3 and the fiber reinforced resin layer 4a or 4b may be separated from each other by any secondary foaming.

In this embodiment, the top plate 5a and the bottom plate 5b can be attached to the surfaces of such fiber reinforced resin layers 4a and 4b, respectively, which surfaces are opposite to the foamed cement layer 3, as the upper surface and the lower surface of the foamed cement board 1.

The method for attaching thereof may be utilized a method same or similar to that of Embodiment 1. For example, they may be attached to each other by an adhesive. Alternatively, they may be attached to each other by pressing. Herein, each of the fiber reinforced resin layers 4a and 4b can be act as an adhesive layer during the attachment by pressing.

In case that the attachment is conducted by pressing, the top plate 5a and the bottom plate 5b are positioned on the upper surface and the lower surface of the foamed cement layer 3 having the fiber reinforced resin layers 4a and 4b, respectively, which layers are prepared as described above, i.e., the foamed cement board 1, and then pressed by a press machine to be integrated together. With respect to such attachment by pressing, the top plate 5a and the bottom plate 5b may be attached separately or simultaneously.

In the explanations above, it is described that the both surfaces of the foamed cement board 1 are pressed in order to smooth the surfaces of the fiber reinforced resin layers 4a and 4b, and to provide uniform thicknesses thereof, and then, the top plate 5a and the bottom plate 5b are pressed on the foamed cement board 1 in order to attach the top plate 5a and the bottom plate 5b to the foamed cement board 1. However, the procedures are not limited thereto. Upon pressing both surfaces of the foamed cement board 1, the top plate 5a or the bottom plate 5b or both thereof may be pressed together with the foamed cement board 1. In such procedures, the pressing steps for the attachment may be reduced.

As described above, the floor panel 11 of this embodiment is explained in detail. The floor panel 11 can provide results same or similar to those of the floor panel 10 as Embodiment 1.

Moreover, in the floor panel 11 of this embodiment, both surfaces of the foamed cement layer 3 are covered with the fiber reinforced resin layers 4a and 4b, and therefore, the rigidity of the foamed cement layer 3 can be increased. The floor panel 11 of this embodiment can provide similar or higher performances to those of the floor panel 10 as Embodiment 1, which performances are verified according to each of the tests described above by the inventor of this invention.

However, the present invention is not limited thereto. Only one of the fiber reinforced resin layers 4a and 4b may be formed on any one surface of the foamed cement layer 3

As described above, the floor panels as Embodiment 1 or 2 according to the present invention are described in detail. The floor panel has a bottom plate on its backside. Therefore, a plurality of floor panels can be applied over a floor so that the bottom plates can be rested on supporting legs in order to conveniently form a free access flooring. In this case, for example, as described in the following modification example, the panel can be modified.

Modification 1

Figure 3:
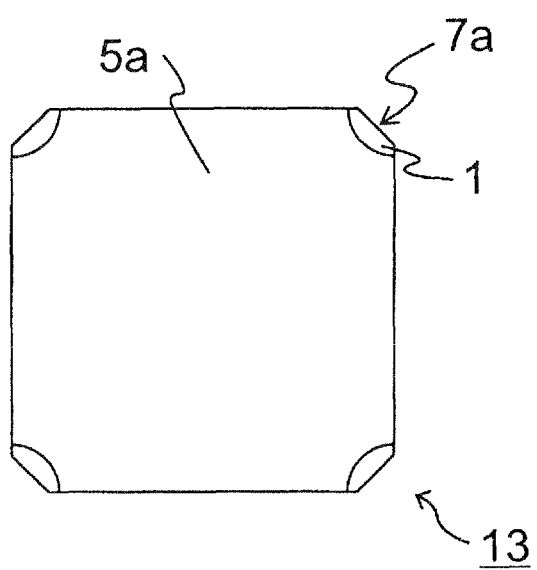
FIG. 3 is a schematic top view illustrating a floor panel as Modification 1 of the embodiment shown in FIG. 1 or FIG. 2.

The floor panel according to the present invention, more specifically, the floor panel as Embodiment 1 or 2 may have a planar configuration having a general square shape, for example, as a floor panel 13 illustrated in FIG. 3. The floor panel may have a configuration provided with cut-outs 7a on the four corners of the foamed cement board 1 (hereinafter, each of which may be referred to as a "corner-processed part 7a" or simply referred to as a "processed part 7a").

In the case that a plurality of the floor panels are applied over a floor to constitute a free access flooring, it is to be considered that a single floor panel is one unit. The units form a grid constituted by the edges of the units (panels). A single supporting leg can be located at each lattice point of the grid. It is preferable that the planar configuration of the single floor panel as one unit has a square shape. In this case, at a single lattice point of the grid constituted by the edges of these units, four corners of the four floor panels can be joined together to be disposed on one supporting leg.

For example, as the floor panel 13 illustrated in FIG. 3, if four corners of the foamed cement board 1 have cut-outs 7a, respectively, a fixing part can fix these panels to a supporting leg wherein the fixing part can be adopted to the cut-outs 7a, and preferably form a general flush surface to the surface of the top plate 5a of the floor panel 13. The supporting leg can be used in a combination with the fixing part, which is disclosed, for example, in Patent Literature 3, etc.

Figure 15:
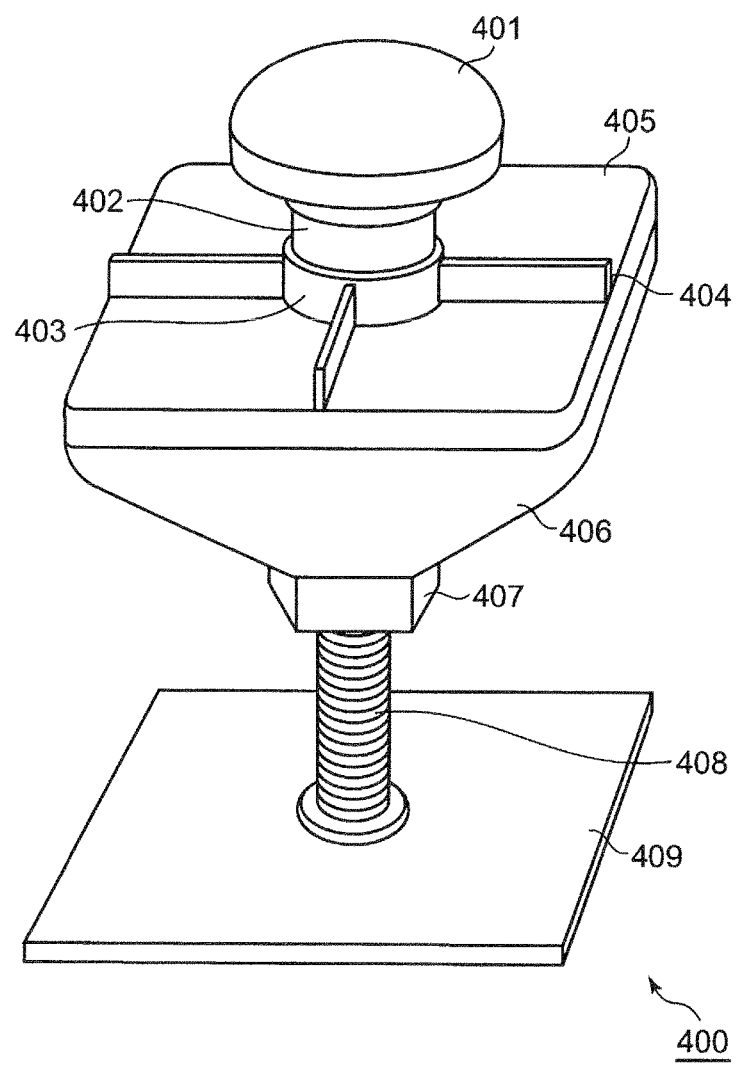
FIG. 15 is a schematic perspective view illustrating an embodiment of a supporting leg which can be employed in the floor panel as the modification according to the present invention.

In this modification, a combination of a supporting leg as shown in FIG. 15, and a fixing part may be employed, as explained below in detail.

The configuration of the cut-out 7a may be optionally and appropriately determined depending on the fixing part being able to be used in a combination. For example, at a proximal area of the cut-out 7a, the foamed cement board 1 may not be covered with the top plate 5a (or the bottom plate 5b).

Optionally, the non-covered area of such foamed cement board 1 may be provided with an additional a cut-out (e.g., a stage, specifically stage having a general sector shape, and the like) in order to receive the fixing part. In this embodiment, these are collectively called as a cut-out (or a corner-processed part or a processed part) 7a.

According to this modification, by using of these cut-outs 7a, the floor panels 13 can be applied and fixed on the supporting leg. Therefore, it can prevent the panels from their backlash, and provide an excellent seismic resistance.

Modification 2

Figure 4:
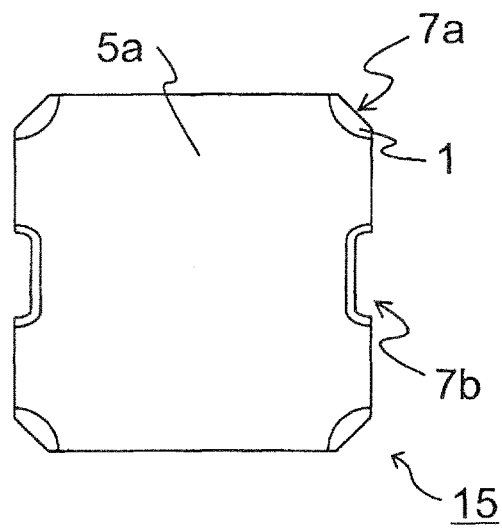
Figure 4:
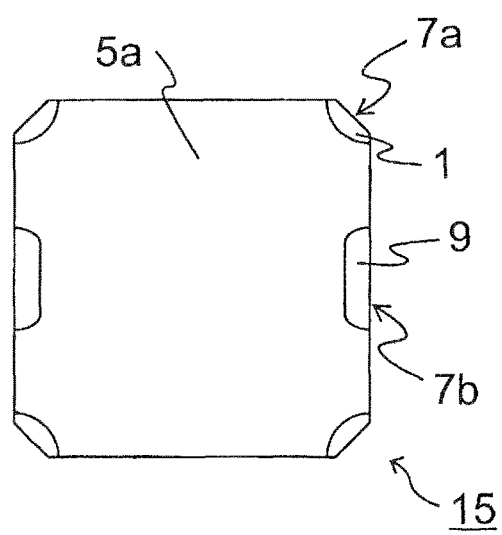

As the floor panel, more specifically the floor panel as Embodiment 1 or 2 according to the present invention, for example, the floor panel 15 as illustrated in FIG. 4 may have a general square and planar configuration, and may have a further cut-out(s) 7b at an area(s) excepting its four corners, more specifically, near the center of the edge of the unit (see FIG. 4(a)).

In the case that a plural of floor panels are applied on a floor to form a free-access flooring, by using of the supporting leg, a space created between the floor panels and the floor can accommodate any wiring (e.g., any various wiring for a telephone line, a telecommunications, a power line, and the like).

As the floor panel 15 illustrated in FIG. 4, in the case that the cut-out 7b is formed at the area excepting the four corners, taking-in/out of the wire, transferring of the wire, or the like, can be conveniently conducted through the cut-out 7b.

The configuration of the cut-out 7b, the number of the cut-outs 7b and the like are not particularly limited. For example, near the cut-out 7b, the foamed cement board 1 may not be covered with the top plate 5a (and/or the bottom plate 5b).

As it is not necessary, in the case that the cut-out 7b is not used, a lid 9 can cover the cut-out 7b to be generally flushed with the top plate 5a of the floor panel 15 (see FIG. 4(b)).

In this case, if necessary, at the area of such foamed cement board 1, which is not covered with the plate, for example, a further cut-out (e.g., a stage and the like) may be formed, depending on the thickness of the lid 9. In this embodiment, they are collectively called as a cut-out 7b (or a processed part 7b).

According to this modification, the cut-out 7b of the floor panel 15 can be used to access to the space created below the floor panel 15. Thereby, the wirings can be freely and excellently arranged.

Moreover, the floor panel 13 as described above as Modification 1 (see FIG. 3) and the floor panel 15 described above as Modification 2 may be used in a combination. In this case, these floor panels 13 and 15 (see FIG. 4) may have a substantially same planar dimension to each other. They can be considered as two units.

The floor panels are described above as two Modifications 1 and 2, other various modifications can be applied thereto without deviating from the scope of the spirit of the present invention.

For example, if the panel has only one cut-out 7b, the production of the floor panel is to be more convenient and the inventory control thereof is also to be more convenient.

Embodiment 3

Figure 5:
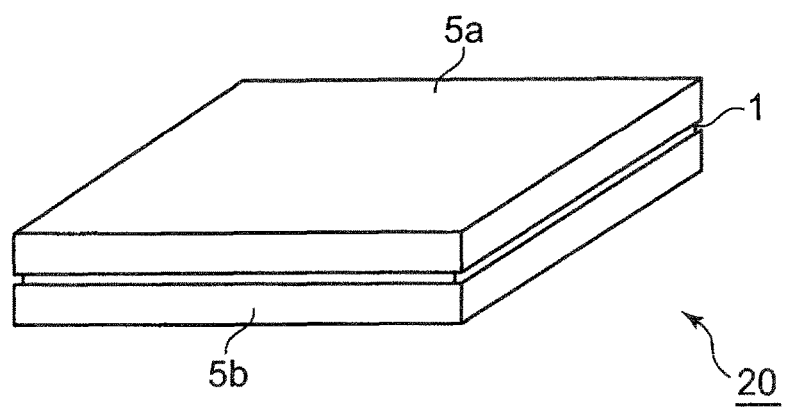
Figure 5:
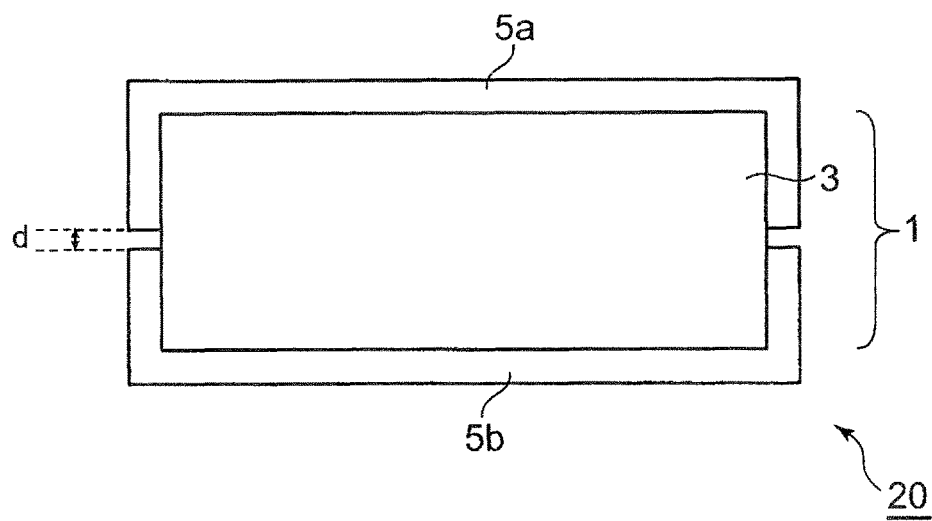

As shown in FIG. 5, the floor panel 20 of this embodiment comprises a foamed cement board 1, a top plate 5c attached to an upper surface of the foamed cement board 1, and a bottom plate 5b attached to a lower surface of the foamed cement board 1, as it is same or similar to the above-described floor panel 10 as Embodiment 1.

Hereinafter, the floor panel 20 of this embodiment is mainly described on the different features from those of the floor panel 10 as Embodiment 1. As long as it is not particularly described, the explanations for Embodiment 1 are similarly applied to this embodiment.

In the floor panel 20, the marginal parts of the top plate 5a and the bottom plate 5b are extended, respectively, as more specifically shown in FIG. 5, so that each of the marginal parts is folded along an edge of a side surface of the foamed cement board 1, and the peripheral surface of the foamed cement board 1 is covered with the marginal parts opposing to each other.

Herein, the floor panel 20 according to this embodiment is not limited to that illustrated in FIG. 5. At least one marginal part of the top plate 5a and the bottom plate 5b may cover at least a part of the peripheral surface of the foamed cement board 1.

For example, only the marginal part of the top plate 5a can be extended to cover the at least a part of or all of the peripheral surface of the foamed cement board 1. Alternatively, only the marginal part of the bottom plate 5b can be extended to cover at least a part of or all of the peripheral surface of the foamed cement board 1.

Herein, the peripheral surface of the foamed cement board 1 means a surface(s) of the foamed cement board 1 excepting the upper surface, to which the top plate 5a can be attached, and the lower surface, to which the bottom plate 5b can be attached. More specifically, the peripheral surface means the side surface(s) and the corner(s) (comprising the apex(s)) of the foamed cement board 1, etc. In the illustrated embodiment, all the four side surfaces and all the eight apexes of the foamed cement board 1 can be covered, but this embodiment is not limited thereto. Therefore, at least a part of at least one of side surfaces and at least one of the apexes of the foamed cement board 1 can be covered with the top plate 5a and/or the bottom plate 5b.

In the embodiment illustrated in FIG. 5, each of four side surfaces of the foamed cement board 1 can be covered with the top plate 5a and the bottom plate 5b, and the four apexes of the upper surface of the foamed cement board 1 are covered with the top plate 5a, and the four apexes of the lower surface of the foamed cement board 1 are covered with the bottom plate 5b.

Such configurations can cover and protect the peripheral surface(s) of the foamed cement board 1 (i.e., the side surface(s) and the apex(s)) with the top plate 5a and the bottom plate 5b. Thereby, the damages on the foamed cement board 1, which may occur during transport, storage, or application or use of the floor panel, can be significantly suppressed.

As described above, in the case that the top plate 5a and the bottom plate 5b are attached to the upper surface and the lower surface of the foamed cement board 1, respectively, by an adhesive, the top plate 5a and the bottom plate 5b can be prevented from moving therefrom. Moreover, use of the top plate 5a and the bottom plate 5b wherein the marginal parts thereof are extending and opposing to each other can significantly prevent the adhesive from bleeding therefrom, and further improve the exterior appearance of the floor panel.

For example, as illustrated in FIG. 5, in the case that the marginal parts of the top plate 5a and the bottom plate 5b are placed, respectively, to oppose to each other, a distance "d" between the marginal parts (see FIG. 5(b)) is, for example, within a range from 1 mm to 15 mm, and preferably within a range from 3 mm to 10 mm.

In this embodiment, adjusting the distance "d" within the range described above can correspond to a stress such as bending stress which is applied to the floor panel.

Method for producing the top plate 5a and the bottom plate 5b illustrated in FIG. 5 includes, for example, a method wherein a single metal plate described above is cut into any appropriate shape having a dimension larger than that of the upper surface or the lower surface of the foamed cement board 1, and pressed and folded by a conventional and existing machine such as a press machine to be formed into the top plate 5a or the bottom plate 5b, but is not particularly limited thereto.

At the corners and apexes of the top plate 5a and the bottom plate 5b, as illustrated in FIG. 5, respectively, the edges may be connected or contacted to each other, or appropriately spaced in a distance.

As described above, the floor panel 20 according to this embodiment is explained in detail. The floor panel 20 can provide the results same or similar to those of the floor panel 10 as Embodiment 1.

Embodiment 4

Figure 6:
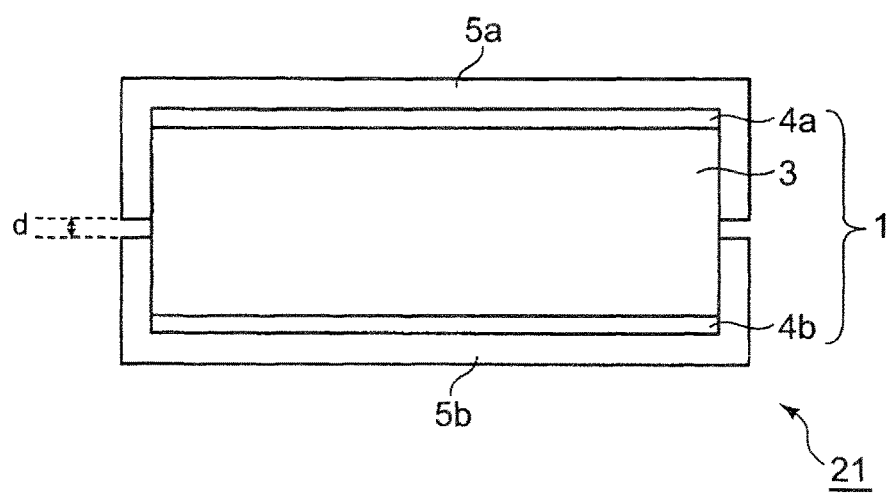
FIG. 6 is a schematic cross-sectional view illustrating a floor panel as Embodiment 4 according to the present invention.

As illustrated in the cross-sectional view of FIG. 6, the floor panel 21 according to this embodiment comprises a foamed cement board 1, a top plate 5a attached to an upper surface of the foamed cement board 1, and a bottom plate 5b attached to a lower surface of the foamed cement board 1, which are same or similar to those explained in Embodiment 2. The floor panel 21 can be used such that the top plate 5a is located as a front surface (or a flooring surface) of the floor panel, and that the bottom plate 5b is located as a back surface of the floor panel.

According to this embodiment, the foamed cement board 1 comprises the fiber reinforced resin layers 4a and 4b formed on both sides of the foamed cement layer 3, which are same or similar to those of the floor panel 11 as Embodiment 2. The top plate 5a and the bottom plate 5b are attached to the fiber reinforced resin layers 4a and 4b, respectively.

According to this embodiment, the top plate 5a and the bottom plate 5b are same or similar to those of the above-described floor panel 20 as Embodiment 3.

According to this embodiment, such configurations can further improve the strength of the floor panel since the foamed cement board 1 comprises the fiber reinforced resin layers 4a and 4b.

As described above, the floor panels as Embodiments 3 and 4 according to the present invention are explained in detail. Such floor panel has the bottom plate on its backside. Thereby, a plurality of the floor panels can be applied on a floor such that the bottom plates of the floor panels are disposed on a supporting leg to conveniently form a free-access flooring. In this case, for example, the following modifications can be applied to the floor panel.

Modification A

Figure 7:
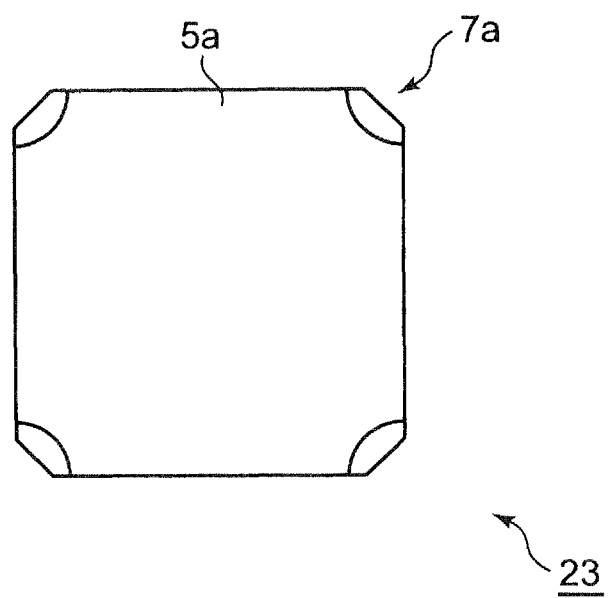
FIG. 7 is a schematic top view illustrating a floor panel as Modification A of the embodiment shown in FIG. 5 or FIG. 6.
Figure 8:
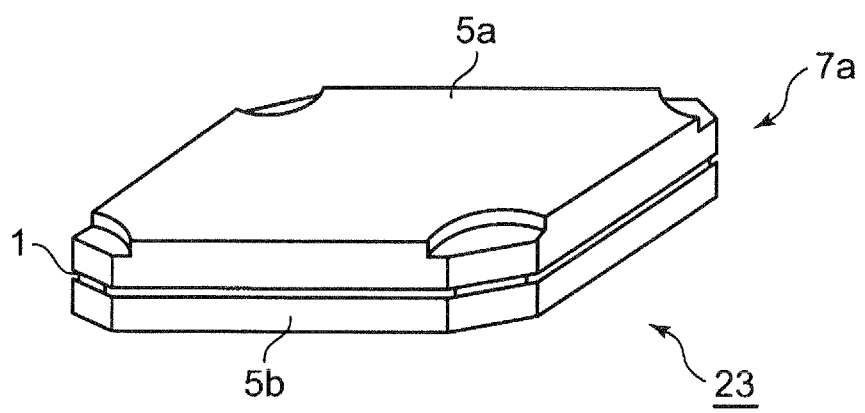
FIG. 8 is a schematic perspective view illustrating a floor panel as Modification A of the embodiment shown in FIG. 5 or FIG. 6.

The floor panels as Embodiments 3 and 4 according to the present invention may have a general square and planar configuration wherein four cut-outs 7a are provided at the four corners thereof, for example, as a floor panel 23 illustrated in FIGS. 7 and 8, respectively. In this modification, the cut-outs 7a formed on the top plate 5a or the bottom plate 5b can be formed by shaping such as pressing a metal plate, which corresponds to the cut-out formed on the foamed cement board 1. Herein, please note that the cut-out 7a is not that formed by actually machining or cutting a plate (hereinafter, the cut-out 7a may be referred to as a "corner processed part or processed part 7a").

The configuration of the cut-out 7a may have any appropriate shape same or similar to that of the above-described Modification 1 depending on the configuration of a fixing part, which can be used in a combination with a supporting leg, and the supporting leg, or the like. Herein, the configurations of the cut-outs which may be provided over the top plate 5a or the bottom plate 5b may be identical or different from each other.

As the floor panel 23 illustrated in FIGS. 7 and 8, in the case that the cut-outs 7a are provided at four corners of the floor panel, respectively, the fixing part allows the floor panels to be fixed on the supporting leg to be adopted to the cut-out 7a, preferably to be generally flushed to the surface of the top plate 5a of the floor panel 23. The supporting leg which can be used in a combination with such fixing part is disclosed, for example, in Patent Literature 3, etc.

In this modification, a combination of the supporting leg and the fixing part, which is illustrated in FIG. 15 further explained below, may be employed (see, more specifically, FIGS. 15-17).

According to this modification, by using of these cut-outs 7a, the floor panels 23 can be applied and fixed on the supporting leg. Therefore, it can prevent the panels from their backlash and provide an excellent seismic resistance.

Moreover, according to this modification, each of the top plate 5a and the bottom plate 5b has a cut-out 7a having a shape corresponding to the configuration of the cut-out provided to the foamed cement board 1. Thereby, the area of the cut-out provided to the foamed cement board 1 can be covered and protected. Accordingly, the damages on the foamed cement board 1, which may occur during transport, storage, or application or use of the floor panel, can be suppressed. Particularly, the damages on the foamed cement board 1 caused by contacting with the supporting leg or the fixing part can be significantly prevented.

Modification B

Figure 9:
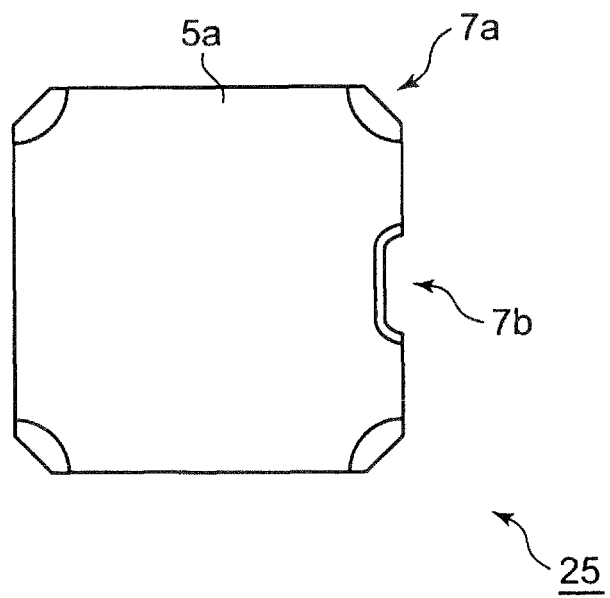
FIG. 9 is a schematic top view illustrating a floor panel as Modification B of the embodiment shown in FIG. 5 or FIG. 6.
Figure 10:
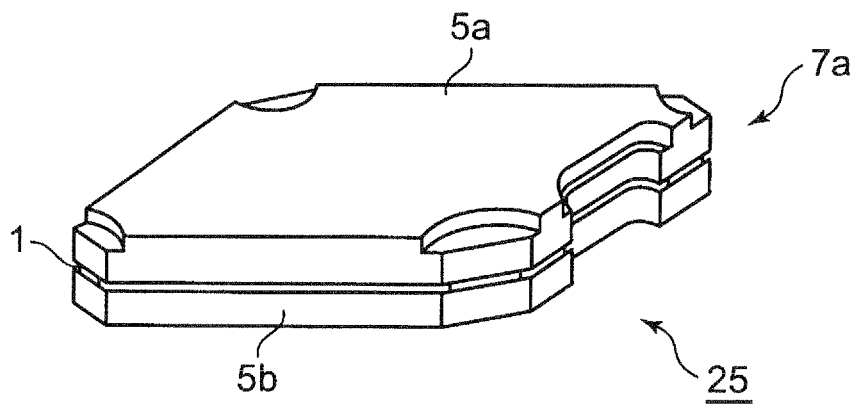
FIG. 10 is a schematic perspective view illustrating a floor panel as Modification B of the embodiment shown in FIG. 5 or FIG. 6.

Herein, the floor panels as Embodiments 3 and 4 according to the present invention may have a general square and planar configuration, for example, as a floor panel 25 illustrated in FIGS. 9 and 10, respectively, wherein a cut-out 7b is additionally provided at the area excepting the four corners, more specifically near the center of one side surface of the floor panel (see FIG. 9). In this modification, the cut-out 7b formed on the top plate 5a or the bottom plate 5b can be formed by shaping such as pressing a metal plate, which corresponds to the cut-out formed on the foamed cement board 1. Herein, please note that the cut-out 7b is not that formed by actually machining or cutting a plate (hereinafter, the cut-out 7b may be referred to as a "processed part 7b").

As a floor panel 25 illustrated in FIG. 9, in the case that the cut-out 7b is provided at the area excepting the four corners, taking in/out of the wiring, transport of the wiring, and the like, through the cut-out 7b, can be conveniently conducted, which are similar to those of the above-identified Modification 2.

The configuration of the cut-out 7b, the number of the cut-out 7b, and the like, are not particularly limited. In the case that the number of the cut-out 7b is one as a floor panel 25 illustrated in FIG. 9, a plurality of such floor panels 25 can be used to conveniently form a free-access flooring having various cut-out patterns. In this case, the production of the floor panel, and the management of the produced floor panels become surprisingly convenient. Herein, the configurations of the cut-outs 7b which may be formed on the top plate 5a and the bottom plate 5b may be identical of different from each other.

Herein, although it is not necessary, in the case that the cut-out 7b is not used, a lid (not shown in the figure) can cover the cut-out 7b so that the lid is generally flushed to the surface of the top plate 5a of the floor panel 25.

As described above, Modifications A and B of the floor panels as Embodiment 3 and 4 are explained. The other various modifications may be applied thereto without deviating from the scope of the spirit of the present invention.

Embodiment 5

Figure 11:
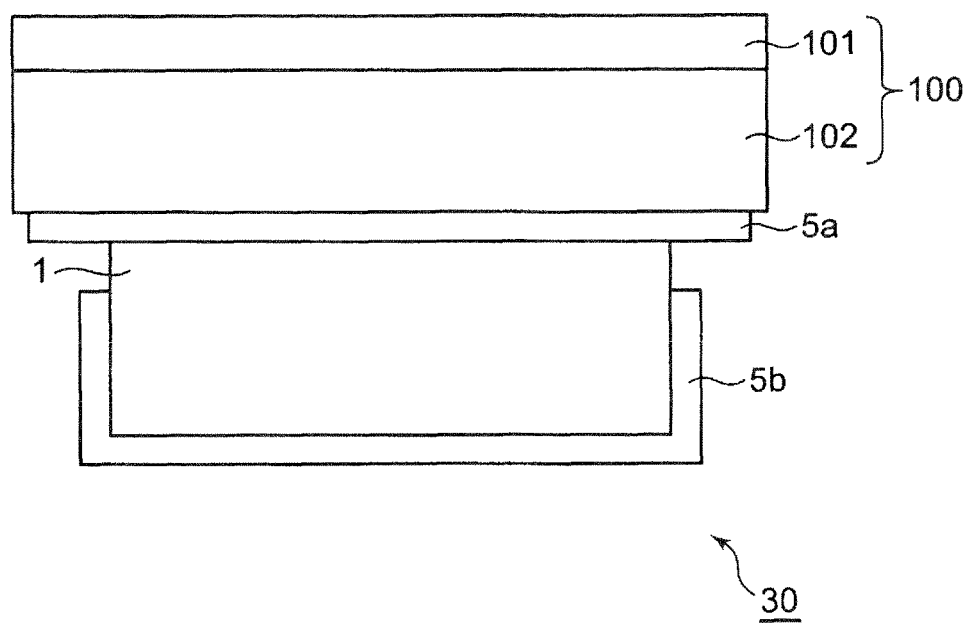
FIG. 11 is a schematic cross-sectional view illustrating a floor panel as Embodiment 5 according to the present invention.

In a floor panel 30 of this embodiment, a marginal part of the top plate 5a is extended such that the top plate 5a has an area same to or larger than that of the upper surface of the foamed cement board 1 (for example, in a length within a range from 0 mm to 10 mm from the side edge of the foamed cement board), and that a marginal part of the bottom plate 5b is extended to cover at least a part of a peripheral surface of the foamed cement board 1 (see, for example, at a position of FIG. 11). On the upper surface of the top plate 5a, a panel 100 having a stone board is located, which has an area larger than the upper surface of the top plate 5a.

The panel 100 having a stone board which can be used in Embodiment 5 comprises a stone board 101 and a panel component (or material) 102, as shown in a cross-sectional view of FIG. 11, wherein the panel having a stone board explained in the above-described Embodiment 1 can be used without any limitation. In Embodiment 5, the stone board explained in the above-described Embodiment 1 can be located instead of the panel 100 having a stone board.

In this embodiment, the marginal part of the stone board or the panel having a stone board is located, for example, at a position within a range from 10 mm to 12 mm from the side edge of the foamed cement board.

In the floor panel 30 as Embodiment 5 illustrated in the figure, the top plate 5a may have an area larger than that of the upper surface of the foamed cement board 1. Thereby, on the upper surface of the foamed cement board 1, the stone board or the panel having a stone board can be sufficiently supported. The stone board or the panel having a stone board may have an area larger than that of the top plate 5a. Thereby, an excellent appearance can be provided to the floor panel 30. Particularly, the above-described high strength-KanaStone commercially available from KANAFLEX CORPORATION can be used as the panel having a stone board. Thereby, in addition to the exterior excellent appearance, a superior weight reduction (e.g., ½ weight or less) can be achieved compared with that used a stone board having the same thickness. Thereby, its workability can be improved. Moreover, a floor panel being able to withstand against 5,000 N or more of a load can be provided. Herein, please note that a standard value required in the static load test for a general floor panel is 3,000 N as described above.

A method for attaching the stone board or the panel having a stone board to the top plate 5a is not particularly limited. For example, the above-described adhesive can be used. Particularly, in the case that the panel having a stone board is employed, it is preferable that the adhesive comprising a polyurethane based-resin, an epoxy based-resin, or the like is used.

In this embodiment, the top plate 5a, as described above, may have an area same to that of the upper surface of the foamed cement board 1, or may have an area same to that of the stone board or the panel having a stone board.

The bottom plate 5b, similarly to the above-described Embodiments 3 and 4, may have an extended marginal part. More specifically, as illustrated in FIG. 11, the bottom plate 5b can be folded along the shape of the bottom of the foamed cement board 1 in order to cover and protect at least a part of the peripheral surface of the foamed cement board 1. It is preferable that the marginal part of the bottom plate 5b covers to an extent at ½ or more of the thickness (or height) of the foamed cement board 1.

Such configurations can significantly prevent the foamed cement board 1 from being damaged or broken during the transport, or storage of the floor panel, or application or use of the floor panel.

In this embodiment, the foamed cement board 1 is same or similar to that of the above-described Embodiment 1. Alternatively, those same or similar to Embodiments 2 and 4 can be used.

In the floor panel 30 according to this embodiment, a through-hole having any configuration may be provided at any place of the floor panel, preferably at a center part thereof, to receive a socket or a pop-up receptacle (having a socket, a jack, a ground, or the like). The pop-up receptacle, which can be employed in this embodiment, may include, but is not particularly limited to, for example, those commercially available without any limitations.

Embodiment 6

Figure 12:
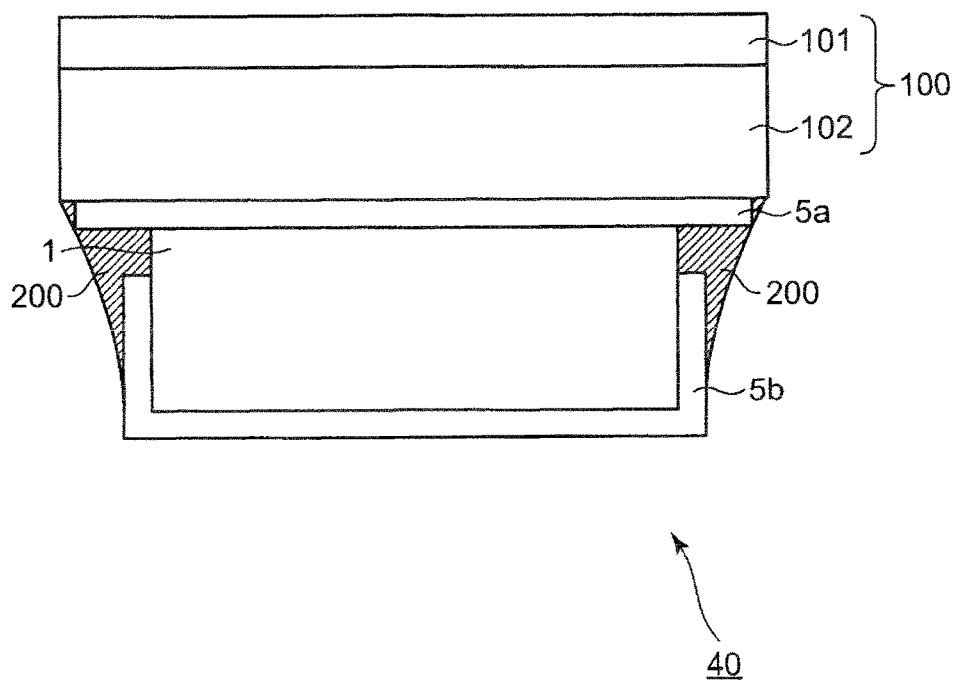
FIG. 12 is a schematic cross-sectional view illustrating a floor panel as Embodiment 6 according to the present invention.

As shown in a cross-sectional view of FIG. 12, a floor panel 40 according to this embodiment is essentially similar to that of the above-described floor panel 30 as Embodiment 5. Herein, the marginal part of the bottom plate 5b is covered with the coking material 200. The exposed peripheral surface of the foamed cement board 1 (i.e., area uncovered by the bottom plate 5b), the marginal part of the top plate 5a, and the bottom surface the panel component 102 of the panel 100 having a stone board are also covered with the coking material 200.

Such configurations can prevent moisture from infiltrating into the foamed cement hoard 1. Thereby, the damage on the foamed cement board 1 can be further prevented.

The coking material being able to be employed in this embodiment can include, but is not particularly limited to, for example, a silicone based-, a modified silicone based-, a polyurethane based coking material, and the like.

In this case that the exposed peripheral surface of the foamed cement board 1 can be at least covered, the amount of the coking material to be used is not particularly limited.

Supporting Leg

In the case that the floor panels as Embodiment 5 or 6 are applied on a floor to form a free-access flooring, a single floor panel can be considered as one unit, and a single supporting leg can be placed at a single lattice point of the grid constituted by the edges of these units.

Figure 13:
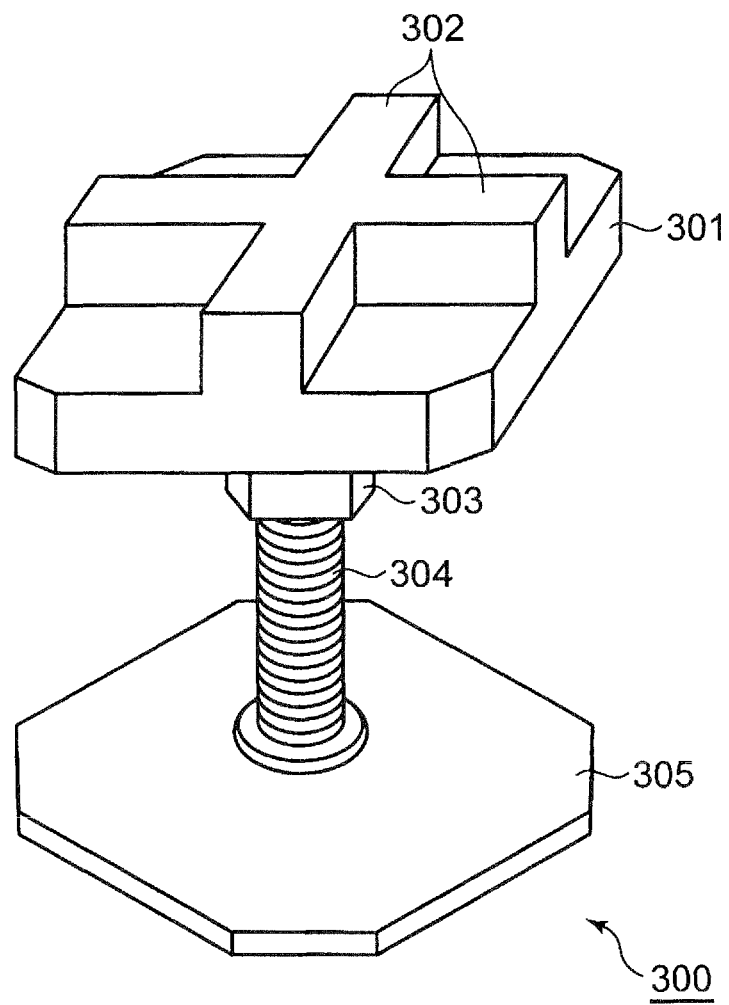
FIG. 13 is a schematic perspective view illustrating an embodiment of a supporting leg which can be employed in the floor panel as Embodiment 5 or 6 according to the present invention.

As the supporting leg, a supporting leg(s) 300 can be employed, for example, which is illustrated in FIG. 13. The supporting leg 300 has a stage 301 having a ridge 302 in a shape of a cross and a flange 305, which are rotatably fixed with a bolt 304 from each other. A nut 303 can adjust the height of the stage 301.

A material to form the supporting leg 300 is not particularly limited. The stage 301 (comprising the ridge 302) may be composed of a resin. The nut 303, the bolt 304 and the flange 305 may be composed of a metal, respectively.

In the case that the stage 301 is composed of a resin(s), the stage 301 can be easily formed. In the case that the nut 303, the bolt 304 and the flange 305 are composed of a metal, respectively, a sufficient strength can be added to the supporting leg.

Figure 14:
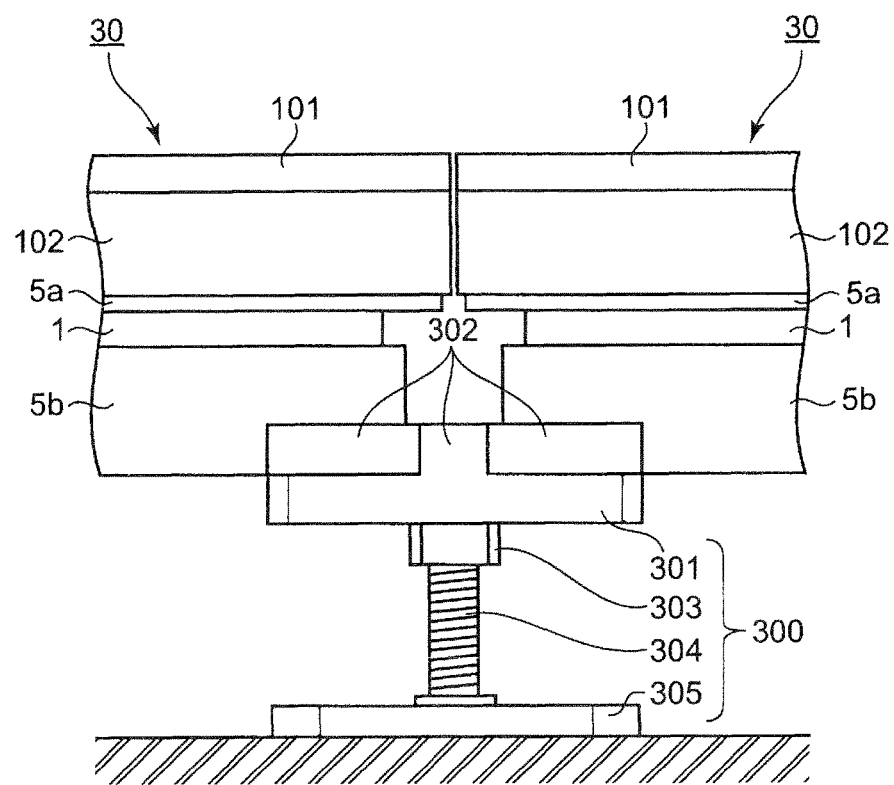
FIG. 14 is a schematic side view illustrating the supporting leg shown in FIG. 13 with the floor panels of Embodiment 5 or 6 according to the present invention being disposed thereon, wherein only two floor panels are shown for its brief explanation.

For example, as shown in FIG. 14 in detail, the supporting leg 300 can be located such that the ridge 302 of the stage 301 can be located between the bottom plates 5b of the neighboring floor panels 30 as Embodiment 5 (which may be the floor panels 40 as Embodiment 6). Herein, the corner of the bottom plate 5b can be located on the upper surface of the stage 301 (i.e., which is an area where the ridge 302 is not presented). In FIG. 14, in order to conveniently explain this embodiment, the number of the neighboring floor panels is two (2). However, generally, four (4) floor panels are located such that the corners thereof get together, and the supporting leg can be located at the center of the joined corners.

Any projecting part can be formed on the backside of the bottom plate 5b near the corner, and a recess having a shape corresponding to the projecting part can be formed on the upper surface of the stage 301 (i.e., which is an area where the ridge 302 is not presented). Thereby, the projecting part formed on the bottom plate 5b can be adapted to the recess formed on the stage 301 in order to further conveniently locate the floor panel.

For example, a plate made of a metal or a resin may be located on the backside of the bottom plate 5b near the corner, and a recess having a shape corresponding to that plate can be formed on the upper surface of the stage 301. Thereby, these can be adapted to each other. Moreover, such plate can adjust the level of the upper surface of the floor panel.

By using of such supporting leg, the floor panels as Embodiment 5 and/or 6 can be applied to the floor to be dealt with, and placed in a distance from the floor. A free-access flooring with a design having an excellent exterior appearance due to its stone board can be provided. Herein, one or more holes can be provided through the flange 305 of the supporting leg 300 in order to fix the flange 305 to the floor with bolts, etc.

Herein, the supporting leg being able to be used for the floor panel as Embodiment 5 or 6 is not limited to those illustrated in the figures.

Moreover, the supporting leg 400 illustrated in FIG. 15 is one to be used in a combination with a fixing part 401, which comprises a stage 405 equipped with ridges 404 arranged in a shape of a cross as well as a supporting part 406 therefor. The stage 405 and the supporting part 406 can be integrated together to be rotatably fixed to the flange 409 with a bolt(s) 408. Herein, according to the supporting leg 400, the nut 407 can adjust the level of the stage 405.

The fixing part 401 has a supporting stem 402 therefor. The supporting stem 402 can be received in a sleeve 403 formed on the stage 405. Such structure can adjust the level of the upper surface of the fixing part 401.

A material to form the supporting leg 400 is not particularly limited. The fixing part 401 (comprising the supporting stem 402) and the stage 405 (comprising the sleeve 403 and the ridges 404) may be composed of a resin, respectively. The supporting part 406 for the stage, the nut 407, the bolt 408 and the flange 409 may be composed of a metal, respectively.

In the case that the fixing part 401 and the stage 405 are composed of a resin, respectively, the formations thereof can be convenient. In the case that the supporting part 406 for the stage, the nut 407, the bolt 408 and the flange 409 are composed of a metal, respectively, a sufficient strength can be added to the supporting leg.

As the above-described floor panel as Modification 1 or 2, Modification A or B, or the like, it is preferable that the supporting leg 400 is adapted to the panel having a cut-out 7a at its corner.

Figure 16:
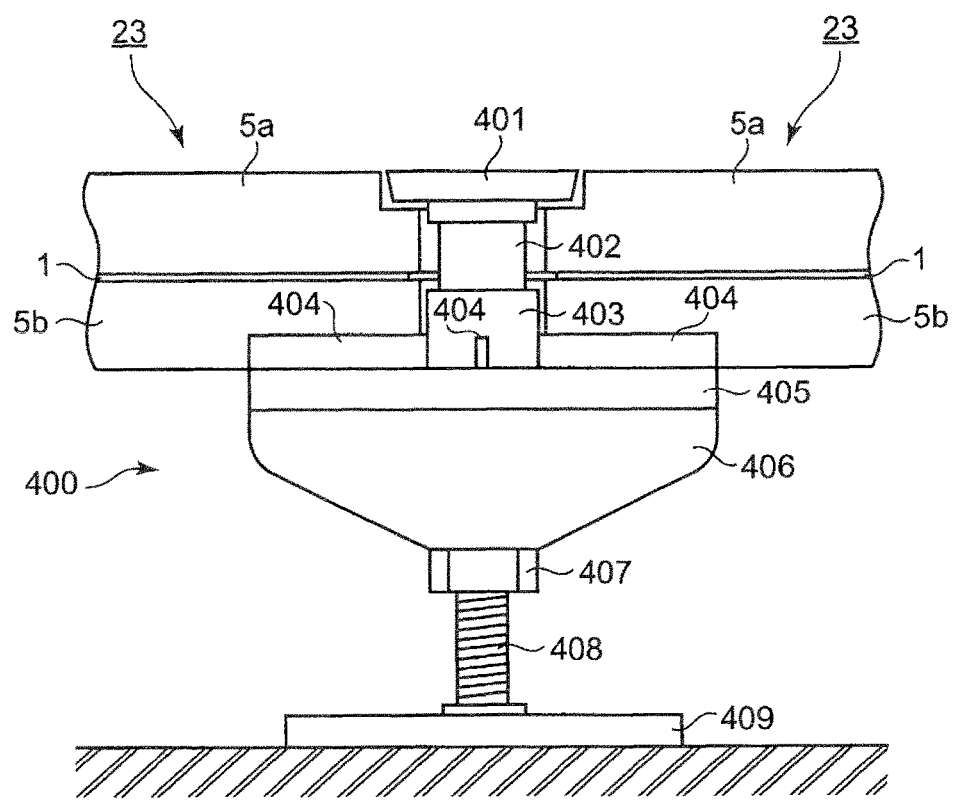
FIG. 16 is a schematic side view illustrating the supporting leg shown in FIG. 15 with the floor panels as Modification A or B according to the present invention being disposed thereon, wherein only two floor panels are shown for its brief explanation.

For example, as illustrated in FIG. 16 in detail, the supporting leg 400 can be provided such that the sleeve 403 on the stage 405 is located through a space formed by the joined cut-outs 7a, each of which is formed at a corner of each of the neighboring floor panels 23 as Modification A (or each of the neighboring floor panels 25 as Modification B, which may be each of the neighboring floor panels as Modification 1 or 2), and such that the ridge 404 can be located between the neighboring bottom plates 5b. Herein, the corner of the bottom plate 5b may be located on the upper surface of the stage 405 (i.e., an area where the ridges 404 are not presented).

The supporting stem 402 of the fixing part 401 may be positioned in the sleeve 403 of the stage 405 so that the top plate 5a can be fixed. Herein, the upper surface of the fixing part 401 is generally flushed with the upper surface of the top plate 5a as illustrated in the figure.

Figure 17:
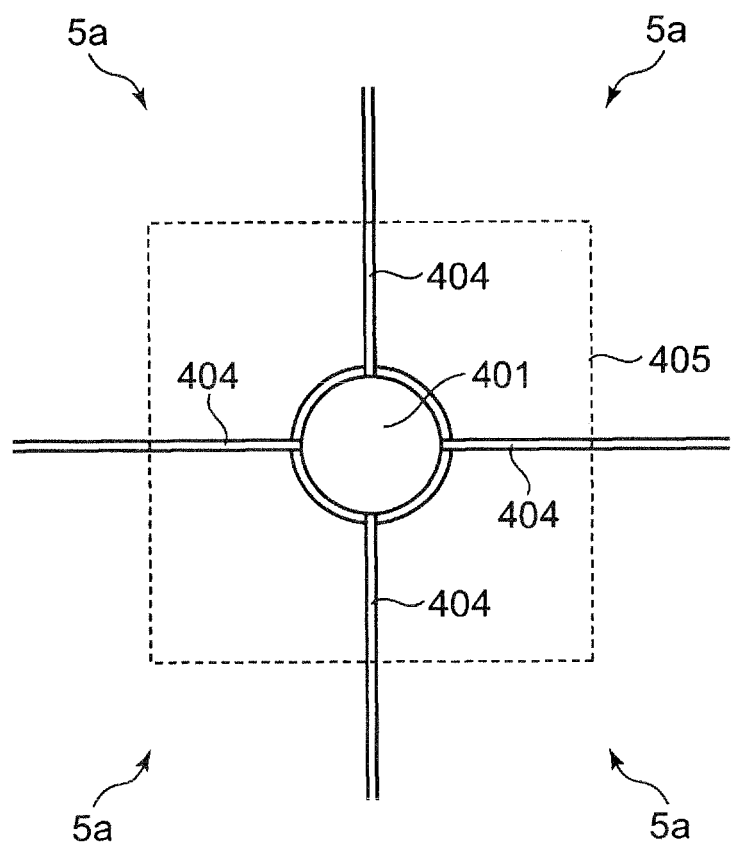
FIG. 17 is a schematic top view illustrating the supporting leg shown in FIG. 15, wherein the leg is placed under the four (4) floor panels as Modification A or B according to the present invention.

As further described in detail, four corners of the floor panels get together as illustrated in a top view of FIG. 17, and, under the center thereof, the supporting leg 400 is located.

In the illustrated embodiment, the upper surface of the fixing part 401 has a configuration of circular shape. Herein, the shape of the upper surface of the fixing part is not limited to such circular shape. Herein, the shape of the cut-out 7a formed at the corner of the floor panel is not particularly limited. The cut-out 7a may be appropriately formed in a shape depending on the specification of the floor panel such that, preferably, the upper surface of the fixing part 401 is generally flushed with the upper surface of the top plate 5a.

Herein, the supporting leg which can be used in the floor panel having such cut-out 7a is not particularly limited to those illustrated in the figures.

EXAMPLES

Example 1

According to the above-described Embodiment 1, a floor panel was produced based on the following specification.
Dimensions of planar panel: 494 mm×494 mm
wherein the foamed cement board has a cut-out in a shape of isosceles triangle (15 mm×15 mm) at the four corners, respectively, and a cut-out in a shape of general sector (radius: 25 mm), at the top plate and the bottom plate, respectively
    Thickness of panel: 21 mm
    Weight of panel: 6.8 kg
    Top plate: hot-dip galvanized steel sheet having thickness of 0.3 mm
    Foamed cement board: single foamed cement layer as follows:
        Foamed cement layer: thickness=about 20 mm
            specific gravity=1.2
            fiber length=4 to 35 mm
            fiber size=10 to 100 μm
    Bottom plate: hot-dip galvanized steel sheet having thickness of 0.3 mm
        Attachment between top plate or bottom plate and foamed cement board: attachment by using of an epoxy resin based-adhesive in an amount of 250 g/m$^2$ Evaluations The floor panel prepared in Example 1 above was used to be evaluated. The four corners were rested on the supporting leg illustrated in FIG. 15, which has a fixing part having an upper surface wherein the diameter is 50 mm, wherein the supporting leg comprises a bolt having a diameter of 12 mm and the supporting leg comprises a stage with an area of 75 mm×75 mm. The distance between the bottom surface of the flange of the supporting leg (70 mm×mm) and the upper surface of the floor panel was adjusted to 100 mm. The panel was evaluated according to the static load test, the impact test, and the rolling load test, each of which was defined in JIS A 1450, "testing methods for free-access flooring". The testing conditions are as follows.

Static Load Test:

This test was carried out such that the given load weight was set at 3,000 N, and, by using of a single unit (one single floor panel), the loading point was set at the center of the panel.

Impact Test:

This test was carried out by using of a single unit (one single floor panel), wherein a carpet ("CARPET TILE NT-350" manufactured by SANGETSU CO., LTD.) was applied thereon during the impacting, and the impacting point was set at the weakest point of the panel (i.e., the center of any one of peripheral edges of the panel)

Rolling Load Test:

This test was carried out such that the given load weight was set at 1,000 N, by using of three (3) units (three (3) floor panels) in a row, a carpet ("CARPET TILE NT-350" manufactured by SANGETSU CO., LTD.) was applied thereon during the loading, and the load was applied on the point which is the center in a direction along the row of the panels.

The results are shown in Table 1, wherein standard values defined by Japan Access Floor Association are also listed together.

TABLE 1

| Testing Methods | Evaluation Items | Standard Values | Example 1 |
|---|---|---|---|
| Static load test (3,000 N) | deformation value upon loading | 5.0 mm or less | 3.0 mm |
| | remaining deformation value | 3.0 mm or less | 1.0 mm |
| Impact test | remaining deformation value | 3.0 mm or less | 1.0 mm |
| | damages (visual observation) | — | None |
| Rolling load test (1,000 N) | remaining deformation value | 3.0 mm or less | 1.0 mm |
| | damages (visual observation) | — | None |
| | backlash (visual observation) | — | None |

As shown in Table 1, the floor panel of Example 1 has a sufficient strength required for a free access flooring.

Example 2

According to the similar procedures to those of Example 1, a floor panel having the following specification based on the above-described Embodiment 3 was produced.
Dimensions of planar panel: 497 mm×497 mm
wherein the foamed cement board has a cut-out in a shape of isosceles triangle (15 mm×15 mm) at the four corners, respectively, and a cut-out in a shape of general sector (having 25 mm of radius and 4 mm of depth), at the top plate and the bottom plate, respectively
    Thickness of panel: 21 mm
    Weight of panel: 6.8 kg
    Top plate: hot-dip galvanized steel sheet having thickness of 0.3 mm, which has four corner-processed parts at four corners, respectively, each of which was previously formed by pressing into a shape corresponding to that of the cut-out formed at the corner of the foamed cement board.
    Foamed cement board: single foamed cement layer as follows:
        Foamed cement layer: thickness=about 20 mm
            specific gravity=1.2
            fiber length=4 to 35 mm
            fiber size=10 to 100 μm
    Bottom plate: hot-dip galvanized steel sheet having thickness of 0.3 mm, which has four corner-processed parts at four corners, respectively, each of which was previously formed by pressing into a shape corresponding to that of the cut-out formed at the corner of the foamed cement board
    Distance d between the marginal part of the top plate and the marginal part of the bottom plate (see FIG. 5b): about 7 mm
        Attachment between top plate or bottom plate and foamed cement board: attachment by using of an urethane resin-based adhesive in an amount of 250 g/m$^2$ Evaluations The floor panel prepared in Example 2 above was used to be similarly evaluated as described above. Results are shown in Table 2.

TABLE 2

| Testing Methods | Evaluation Items | Standard Values | Example 2 |
|---|---|---|---|
| Static load test (3,000 N) | deformation value upon loading | 5.0 mm or less | 2.0 mm |
| | remaining deformation value | 3.0 mm or less | 0.5 mm |
| Impact test | remaining deformation value | 3.0 mm or less | 0.6 mm |
| | damages (visual observation) | — | None |
| Rolling load test (1,000 N) | remaining deformation value | 3.0 mm or less | 0.6 mm |
| | damages (visual observation) | — | None |
| | backlash (visual observation) | — | None |

As shown in Table 2, the floor panel of Example 2 has a sufficient strength required for a free access flooring.

According to the floor panel of Example 2, the floor panel has an excellent exterior, without any bleeding of the adhesive, at the peripheral surface thereof. Moreover, during the production, the preformed top plate and the preformed bottom plate should be simply and quietly left on the foamed cement board via the adhesive. It was found that an excellent workability was obtained without any labors for positioning and fixing of the plates.

The present application claims the priority based on the Japanese Patent Application No. 2013-8494 filed on Jan. 21, 2013 in Japan, which disclosure is incorporated herein by reference in its entirety.

INDUSTRIAL APPLICABILITY

The floor panel according to the present invention can be used in various applications such as a floor panel for indoor and outdoor applications. The floor panel according to the present invention can be preferably utilized as a flooring material particularly for a free access flooring (or for so-called OA flooring). The applications are not limited thereto.

EXPLANATIONS OF LETTERS OR NUMERALS

1: foamed cement board
3: foamed cement layer
4a, 4b: fiber reinforced resin layer
5a: top plate
5b: bottom plate
7a, 7b: cut-out
9: lid
10, 11, 13, 15, 20, 21, 23, 25, 30, 40: floor panel
100: panel having stone board
101: stone board
102: panel component
200: coking material
300: supporting leg
301: stage
302: ridge
303: nut
304: bolt
305: flange
400: supporting leg
401: fixing part
402: supporting stem for fixing part
403: sleeve
404: ridge
405: stage
406: supporting part for stage
407: nut
408: bolt
409: flange

The invention claimed is:

1. A floor panel comprising:
a foamed cement board comprising at least a foamed cement layer;
a top plate attached to an upper surface of the foamed cement board; and
a bottom plate attached to a lower surface of the foamed cement board,
wherein the foamed cement layer comprises a porous hardened cement phase and a fiber dispersed in the phase, and the foamed cement layer has a thickness within a range from 12 to 30 mm and a specific gravity within a range from 0.8 to 1.5,
at least one of the top and bottom plates is a metal plate,
a marginal part of the top plate and a marginal part of the bottom plate cover at least a part of a peripheral surface of the foamed cement board,
wherein the marginal part of the top plate and the marginal part of the bottom plate are opposed to each other along the peripheral surface of the foamed cement board, and
opposing surfaces of the marginal part of the top plate and the marginal part of the bottom plate are separated by a distance (d).

2. The floor panel according to claim 1, wherein the distance between the opposing surfaces of the marginal part of the top plate and the marginal part of the bottom plate is within a range from 1 to 15 mm.

3. The floor panel according to claim 1, wherein the top plate has an area equal to or larger than that of the upper surface of the foamed cement board, and
the floor panel further comprises a stone board or a panel having a stone board, which has an area larger than that of the top plate, on the upper surface of the top plate.

4. The floor panel according to claim 1, wherein at least one of the top and bottom plates is attached to the upper surface of the foamed cement board or the lower surface of the foamed cement board by an adhesive.

5. The floor panel according to claim 4, wherein the adhesive comprises at least one resin selected from the group consisting of chlorinated polyolefin based-, polyurethane based-, epoxy based-, acrylate based-, vinyl based-, vinyl acetate based-, polyester based-, ethylene-vinyl acetate copolymer based-, acrylate-vinyl acetate copolymer based-, polyamide based-, and ionomer based resins.

6. The floor panel according to claim 4, wherein the adhesive is used in an amount within a range from 150 to 500 g/m$^2$.

7. The floor panel according to claim 1, wherein the foamed cement board further comprises a fiber reinforced resin layer formed on at least one surface of the foamed cement layer.

8. The floor panel according to claim 1, wherein the metal plate has a thickness in a range from 0.25 to 1.0 mm.

9. A floor panel comprising:
a foamed cement board comprising at least a foamed cement layer;
a top plate attached to an upper surface of the foamed cement board; and
a bottom plate attached to a lower surface of the foamed cement board, wherein the foamed cement layer comprises a porous hardened cement phase and a fiber dispersed in the phase, and the foamed cement layer has a thickness within a range from 12 to 30 mm and a specific gravity within a range from 0.8 to 1.5,
wherein at least one of the top and bottom plates is a metal plate having a thickness within a range from 0.25 to 1.0 mm.

* * * * *